United States Patent [19]

Witzel

[11] 4,408,618

[45] Oct. 11, 1983

[54] AXIAL FLOW ROTARY SEPARATOR

[76] Inventor: Homer D. Witzel, Englewood City, Fla.

[21] Appl. No.: 157,141

[22] Filed: Jun. 6, 1980

[51] Int. Cl.³ .............................................. A01F 7/06
[52] U.S. Cl. ..................................................... 130/23
[58] Field of Search ............ 56/146; 130/27 T, 27 H, 130/27 Q, 23

[56] References Cited

U.S. PATENT DOCUMENTS

| 4,031,901 | 6/1977 | Hill | 130/27 T |
| 4,178,942 | 12/1979 | Nusser | 130/30 H |
| 4,249,543 | 2/1981 | Hill | 180/27 T |

Primary Examiner—Robert A. Hafer

[57] ABSTRACT

In a combine harvester axial flow rotary separator, crop material is propelled in a generally spiral path as a relatively thin mat, maintained in contact with the inner wall of a cylindrical separator housing due to centrifugal force from the motion imparted to the mat by a rotor. The rotor, in each of several embodiments disclosed, carries finger-like elements which intermittently penetrate and positively propel portions of the mat without compressing it, the finger action and motion providing the desired axial displacement as well as circumferential movement of portions of the mat without relying on additional axial indexing aids such as guide vanes in the housing.

60 Claims, 28 Drawing Figures

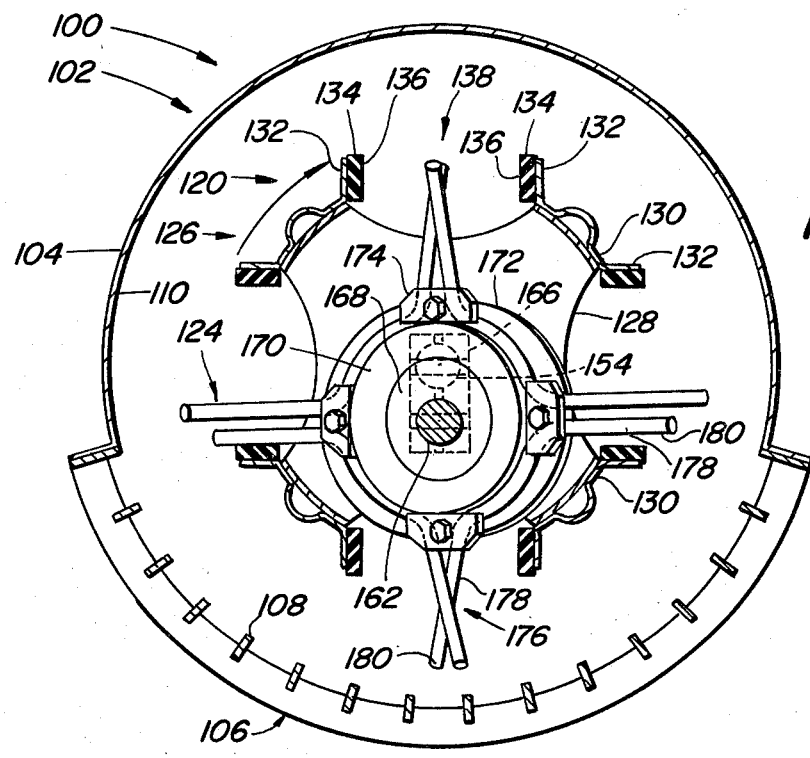
FIG. 5
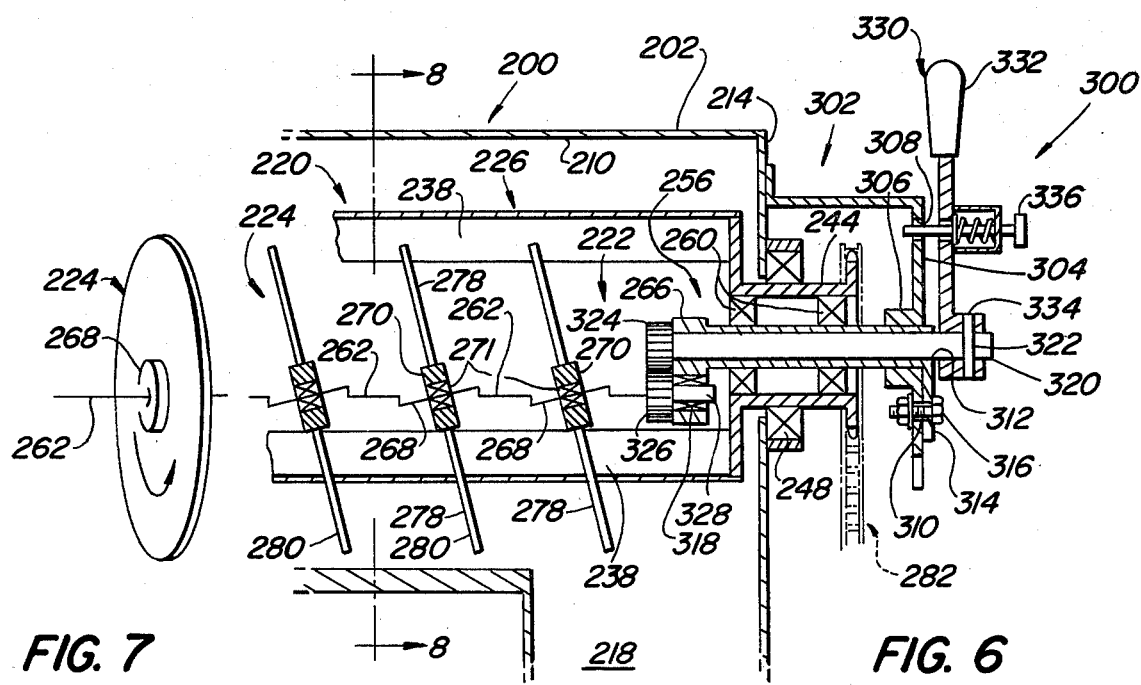
FIG. 7
FIG. 6

AXIAL FLOW ROTARY SEPARATOR

BACKGROUND OF THE INVENTION

The present invention relates to the processing of harvested crop material, such as threshing and separation in a combine harvester. More particularly, it relates to rotary separators of the helical or spiral flow path-type, commonly called axial flow, in which threshed grain is separated from material other than grain (mog). The invention may also have application in association with axial flow rotary threshing or cleaning mechanisms.

Combines with axial flow rotary separators are well known. Typically, harvested crop material is fed into the annular space between a fixed generally cylindrical and at least partially foraminous separator housing and a rotor rotating concentrically within the housing. Material control elements, such as fixed helically disposed guide vanes on the housing and/or angled blades and bars on the generally cylindrical surface of a rotor, engage the crop material and propel it in a generally helical or spiral path as the rotor rotates. Threshed and separated grain passes outward through the foramina of the housing to a cleaning shoe while the bulk of the material (mostly straw in grain harvesting, for example) is ultimately discharged from a downstream outlet of the housing. Combines with separators of this general type are disclosed in U.S. Pat. Nos. 3,848,609 and 3,982,548. All such known commercial axial flow rotary separators employ rotors with fixed or passive material control elements. The crop engaging elements are typically carried by and fixed rigidly to a rotor core or frame. Rotors of this general type have been developed to perform with acceptable efficiency and consistency in some but not all crop harvesting conditions.

Most known axial flow rotary separators are, at least potentially, volumetrically efficient compared with such devices as the traditional straw walker separator in that a given output is possible from a separator of smaller overall size. However, some characteristics basic to the operation of known axial flow rotary separators, especially those now in commercial use, result in undesirably high levels of specific power consumption and chaff generation (breaking up of straw, etc.).

The force needed to convey material is obtained by friction and compression of the straw mat at the rotor/straw interface. Function depends on relatively small clearances between rotor and housing making the separator relatively sensitive to crop material condition, such as moisture content and straw length. Frictional forces arise from slippage between the rotor and the straw mat and from the movement of the straw mat over the inner surface of the housing, including the particular friction from elements such as helical guide vanes effecting the axial indexing of the straw mat. This requires significantly more energy than separators with mechanisms that provide positive material conveyance, such as straw walkers. Further, because the straw mat is compressed by the rotor and by centrifugal force, penetration of grain through the mat is impeded and must be overcome by the addition of still more energy for agitation of the mat. Thus, a high proportion of the total power consumed by the separator is dissipated in and through the straw mat, frequently resulting in undesirable changes in the structure of the material and including excessive chaff generation requiring relatively more cleaning shoe capacity.

SUMMARY OF THE INVENTION

A principal object of the present invention is to provide a separator rotor which, in combination with a separator housing, defines an axial flow rotary separator retaining the advantages inherent in such separators, such as high volumetric efficiency or specific capacity and slope insensitivity but with lower specific power consumption and improved, more positive and predictable material handling characteristics, tolerant of a wider range of crop types and conditions.

According to the invention, material propulsion by crop material engaging elements of a rotor is positive, at least circumferentially and preferably also axially, so that crop material, virtually under complete and continuous control of the rotor elements, is propelled positively through the separator in a generally helical path and at a predictable and preferably controllable rate. Preferably, the rotor propels crop material in the separator at such a circumferential speed that the material, generally distributed in a mat, is maintained in contact with the inner surface of a housing wall and the principal engagement of the rotor with the material mat is through a plurality of crop material engaging elements of such form and so articulated with respect to a rotor frame or frame member and/or the axis of the housing that, as the rotor rotates, each element engages the crop material mat only intermittently, periodically penetrating and withdrawing from the mat more or less radially or at least with a minimum compressive effect on the mat. During engagement, each element may also index its portion of the mat downstream so as to propel it in a generally helical path with or without the assistance of axially indexing members attached to the separator housing. Intermittent but positive, generally helical propulsion provides for axially indexing or progressing the crop material through the separator housing with a minimum of power dissipating slippage (and hence friction) between the rotor and the crop material mat. While in engagement, especially if finger-like crop material engaging elements penetrating the mat generally radially are used, propulsion is positive and not dependent on friction, the crop material being pulled by the finger in contrast to the pushing and bulldozing or wedging action of passive blades or bars on conventional axial flow separator rotors. Release of or withdrawal from a portion of the mat by any one crop engaging element, preparatory to its engagement and advancement by another element, is smooth and unforced and also results in local variations of speed of movement, with local attenuation of the mat and possibly with some tumbling, a form of mat agitation contributing to efficiency of separation by assisting grain penetration in a situation where centrifugal force has already intensified the force field acting on the grain in the straw mat.

The potential for lower specific power consumption of a crop processor (such as a separator) according to the invention, is readily apparent from a comparison of its characteristics with those of conventional axial flow rotary separators. It is the nature of both that there be some "slip" between the crop material and the rotor in the annular space between rotor and housing; the mean circumferential speed of the crop mat is less than the peripheral speed of the crop material engaging elements of the rotor (the straw may be regarded as a fluid element propelled and agitated by the rotor in the confines of the housing). It is well known that with conventional rotors, with fixed engaging elements, the ratio of crop mat speed to rotor peripheral speed is of the order of only 20 to 30 percent, whereas with positive propulsion with an appropriate concentration of crop material engaging elements as in the present invention, slip may be nearly eliminated and mean or effective ratios of circumferential velocity, mat to rotor element, of the order of 80 percent or more may be attained. Therefore, for a given axial indexing characteristic, where throughput rate is dependent on crop mat circumferential velocity, a given throughput rate can be obtained in a separator according to the invention, with a much lower rotor speed and potentially much lower power consumption. Given that horsepower consumed by the rotor is a function of rotor RPM (not crop mat RPM) and torque delivered, and that torque delivered depends on friction between the crop material mat and the housing (a factor common to both types of separator), then the power consumption of the rotor will be proportional to the rotor RPM. The reduced tendency to mat compression and wedging action of a rotor according to the invention, reducing friction between mat and housing, adds to the specific power advantage.

In keeping with the invention, a separator rotor may include a rotor frame member serving, at least in part, as a source or generator of axial movement for crop engaging elements. For example, an intermediate rotor element may be journaled on an oblique axis forming a part of the rotor frame member and serve to transmit or transfer oscillation in the form of axial reciprocation to a crop engaging element which may be integral with the intermediate rotor element or pivotally or at least operatively connected to it. Effective eccentricity of a crop engaging element with respect to the housing (and hence intermittent engagement with a crop material mat), may derive from a simple eccentricity in the mounting of the rotor frame member and/or driving its center in an orbital path, or may come from an extra articulation or variable geometry associated more or less directly with the crop material engaging element itself. In the latter case, the rotor mechanism may conveniently but not necessarily, be generally co-axial or concentric with the separator housing. In all cases, means are provided for coordinating the timing of the axial oscillation and effective eccentricity of the crop material engaging elements so that the aggregate effect of their engagement of the crop material mat is generally spiral propulsion in a given direction.

In a first general form of embodiment of the invention, a principal rotor axis may be generally parallel to but offset or eccentric from the axis of the separator housing so that crop material engaging elements of the rotor, preferably carried on a rotor frame member by intermediate rotor elements and, constrained to move in a generally circular path about the rotor axis, approach and recede from the housing inner surface as the rotor rotates. The engaging elements may be connected to and/or controlled by one or more intermediate rotor elements rotatable about an axis or axes so inclined to the principal rotor axis that each engaging element follows a circular path oblique to the housing axis. The plane of the axis of rotation of the intermediate rotor element may be chosen and timed, so that the paths of the engaging elements are all inclined in the same direction, if not parallel, and so that the portions of the paths most closely adjacent the housing wall have an axial component in the desired direction of feeding crop material through the separator. Thus, during the period or arc of engagement of the mat by the crop engaging element (or the period of the relatively deepest penetration of the mat), the motion of the element results in axially indexing portions of the mat in the required direction while it is propelled circumferentially.

In this context, a rotor portion principal axis may be approximately parallel to but offset from the housing axis and pass through the center of one or more intermediate rotor elements, whose axes of rotation preferably intersect said principal axis. A rotor assembly may comprise a series of two or more axially contiguous offset portions whose principal axes are circumferentially spaced, for example, for purposes of balance.

It is a feature of this first form of embodiment that, for a given basic or true angle of inclination of the axis of rotation of the intermediate rotor element relative to the housing axis, the throughput rate or rate of axial indexing of the separator may be controlled by providing means for revolving or retiming the axis of rotation of the rotor intermediate element with respect to the plane common to the axis of the housing and the offset principal axis of the rotor portion. For example, the intermediate rotor element (or elements) may be journaled on a crank pin (centered on the rotor portion principal axis) with its axis of rotation in fixed relationship to the crank pin. Rotational adjustment of the crank pin may then be used to adjust the orientation of the axis of rotation so as to place the plane of action of the intermediate rotor element selectively, as desired, and adjust the rate of throughput, including arresting the axial movement of crop material or possibly reversing it to clear a blockage.

In another variation of an eccentric inclined plane intermediate rotor element embodiment, means may be provided to adjust the position of the rotor element center with respect to the housing axis. This adjustment may be used to adjust the action of the separator to suit a particular crop condition and preferably would permit the rotor element center to be placed in any one of a range of positions lying in a circular arc centered on the housing axis.

In a further variation of an eccentric inclined plane intermediate rotor element embodiment, means may be provided for driving the entire rotor element to move in a circular orbit centered on the housing axis while maintaining the relative inclination or timing of the axis of rotation of the one or more intermediate rotor elements with respect to the plane common to the axis of the housing and the offset principal axis of the rotor portion. In this way, the arc of engagement of the rotor element (or more particularly of its crop engaging portions) revolves circumferentially within the housing while maintaining a given axial indexing effect according to the plane of inclination of the intermediate rotor element. Thus, virtually the entire housing wall inner surface may be swept periodically, minimizing "dead spots" in which crop material might otherwise accumulate. Preferably, the intermediate rotor element may be revolved or orbited around the housing axis at a variable speed and, to facilitate optimization of separator function, this drive may be independent of the drive means for rotating the intermediate rotor element about its own inclined axis.

Preferably, the circumferential speed of the crop engaging elements connected to the intermediate rotor element, relative to the housing, will be such as to engage and control the crop material in the separator in a mat of substantially uniform thickness generally distributed around and in contact with the housing wall inner surface. A particular orbital speed of the intermediate rotor element center will then establish a speed of rotation of the rotor element relative to its own inclined axis which will in turn determine a particular net axial indexing potential for the element.

In a second general form of embodiment of the invention, the articulation of crop-engaging elements of a rotor is such that at least a portion of each crop-engaging element successively extends outwards and retracts inwards relative to the rotor axis as the rotor rotates so that each crop-engaging element periodically approaches and recedes from the housing wall, consequently intermittently engaging and disengaging, or increasing and decreasing its degree of engagement with any crop material mat or portion of a mat carried on the wall. In this form of embodiment, intermittent engagement does not depend on eccentricity of the rotor axis with respect to the housing axis, although, of course, such eccentricity may be appropriate in some applications.

In one version of the second form of embodiment, the principal crop engaging elements may be a plurality of finger-like members hingedly connected at their inner ends to an intermediate rotor element, such as a drum or a plurality of generally axially extending bars carried by a rotor frame member, the rotor or separator including means for axially reciprocating the crop engaging elements relative to the housing. The fingers may be hinged so as to swing between a generally radially extending stopped position and a folded or retracted stopped position in which the axis of the finger is inclined in the general direction of the housing axis and in a downstream direction, that is in the direction of feeding crop material through the separator housing. Thus, relying on inertia of the finger and/or other bias means, the finger assumes a generally radially extending position to engage the crop material mat as the element carrying it moves in the downstream direction and folds or retracts to disengage from the mat on the return stroke of the reciprocation. Thus, as the rotor rotates, each finger element intermittently engages and releases a portion of the mat, the combination of rotation of the rotor (circumferential movement of the element) and downstream movement while engaged resulting in a displacement of the engaged portion of the crop mat in a generally helical path, the aggregate effect of the elements of the rotor being to propel the crop material spirally downstream.

In another version of the second form of embodiment, the "effective eccentricity" of the crop engaging elements results, at least in part, from maintaining them in a particular orientation with respect to the rotor frame as they are carried on longitudinal bars moving in an oblique orbit centered on the rotor axis.

In keeping with the invention is a separator arrangement in which the rotor includes another form of functional element such as a threshing or separating bar in addition to crop material engaging elements which intermittently penetrate and disengage from a crop material mat. For example, threshing bars may partially or completely axially overlap a primarily separating configuration. In that portion of the separator where both types of element are present, the primary function may be threshing, but with the intermittently engaging element performing an important material control function, including conveying, while also assuming its separating function.

Also in keeping with the invention, a separator rotor may have a central structure of substantially smaller cross-sectional dimension than that of the generally cylindrical surface defined by the principal crop-engaging elements of the rotor as it rotates. Functions of this central or core structure may include, providing a frame or structural support for the rotor as a whole, as well as a control or drive function controlling, at least in some degree, the movement of the principal crop-engaging elements of the rotor. The core structure may carry particular functional elements as mentioned above and may also be arranged to perform a stripping and intermittent shielding function for the crop engaging and propelling elements, helping them to achieve the intermittent engagement or varying degrees of engagement of crop material which is important in the invention. Stripping action may be facilitated by the use of a core structure eccentric to the housing in which case the crop engaging elements of the rotor need not be carried in an eccentric path. An eccentric core structure or drum is also well suited to carrying functional elements such as threshing bars, permitting optimizing of the functional element/housing clearance for the particular function (such as threshing) but limiting that particular (usually reduced) clearance to only a limited arc of the internal housing surface so as not to detract substantially from the crop material handling capacity inherent in separators according to the invention.

It is a feature of the invention that in exemplary embodiments, rate of throughput of crop material may be controlled by the adjustment of rotational inputs to the rotor assembly. A first rotational input may essentially determine circumferential velocity of crop material mat portions engaged by rotor elements while a second rotational input, possibly independently of the first rotational input, establishes an axial velocity for crop material mat portions. In addition as explained above, provision may be made for adjusting a part of the rotor structure so as to change its axial indexing potential. Crop processors, with rotors according to the invention therefor, lend themselves to automatic control of throughput to maintain, for example, a given level of efficiency of separation by making operating parameters such as speeds of rotation or configurational adjustment responsive to sensing of measures of performance parameters such as grain loss in the separator or cleaning shoe discharges of the combine.

BRIEF DESCRIPTION OF THE DRAWINGS

FIG. 5 is a cross-sectional view of the separator assembly on line 5—5 of FIG. 4.

FIG. 6 is a partial and semi-schematic view similar to FIG. 4 of an alternate embodiment with an adjustably positioned fixed rotor center and adjustable finger wheel plane of rotation.

FIG. 7 is a schematic showing a single finger wheel of FIG. 6 with plane of rotation rotated through 90 degrees.

DESCRIPTION OF THE PREFERRED EMBODIMENT

Figure 1:
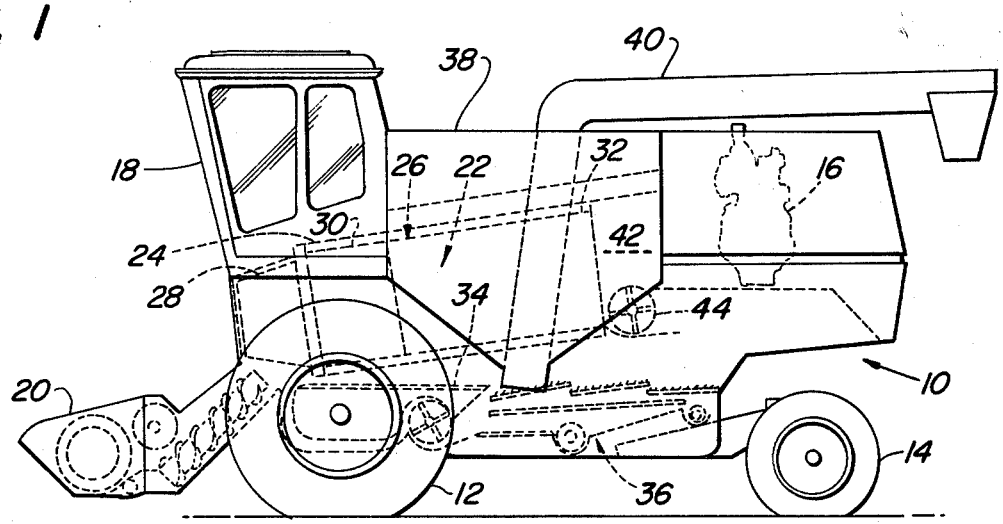
FIG. 1 is a semi-schematic side elevation of a self-propelled combine harvester for embodying the invention, having a separator with a single fore-and-aft separator rotor.

A separator embodying the invention is advantageously used in a self-propelled combine harvester of the general type shown in semi-schematic side view in FIG. 1. Combines of this general type are well known, see, for example, U.S. Pat. Nos. 3,848,609 and 3,982,548.

Such combines may include a main body 10 supported above the ground by pairs of front and rear wheels 12 and 14, respectively, and propelled over the ground by an engine 16 connected to the wheels by a transmission (not shown). The combine is controlled from a forward operator station 18. A forward mounted harvesting header 20 gathers crop material from a field as the combine advances and elevates it to a fore-and-aft oriented single rotor separator 22.

The separator 22 includes a housing 24 surrounding a rotor 26, the nature of which is generally differentiated according to function and includes a forward receiving and feeding portion 28, and threshing and separating portions 30 and 32 respectively. Crop material delivered by the header 20 to the feed rotor 28 is conveyed rearwardly through the threshing and separating portions of the separator, the rotor 26 cooperating with the housing 24 to propel the crop material in a generally spiral path in a relatively thin mat distributed around the inside of the separator housing 24. At least a portion of the housing 24 is foraminous so that separated grain and other small fractions of the crop material mixture can pass outwards through the foramina to be collected by a grain pan 34 and delivered to a conventional cleaning shoe 36. Clean grain is delivered to a grain tank 38 for holding until eventual unloading by a discharge auger assembly 40. The bulk of the crop material, mostly straw, is propelled to a rearward outlet 42 and discharged onto the ground with the aid of a transverse beater 44.

Figure 2:
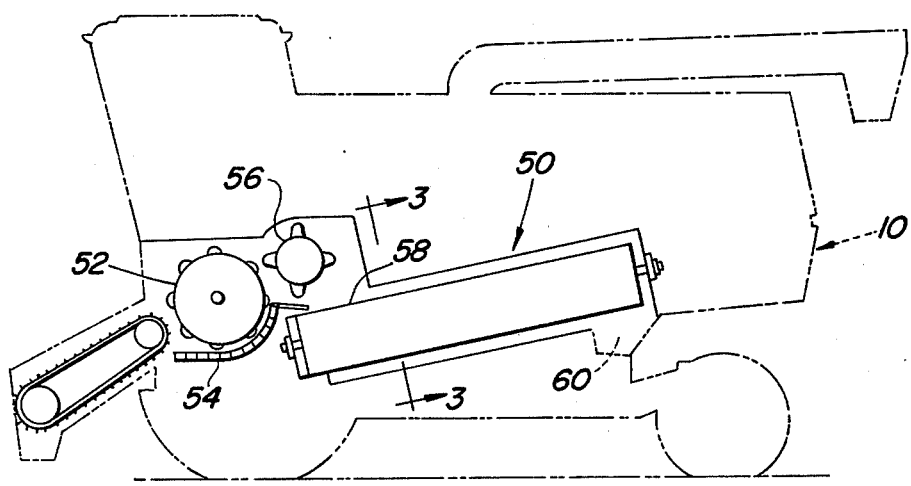
FIG. 2 is a view similar to FIG. 1 of a combine for an alternative embodiment of the invention with a transverse, circumferentially fed threshing cylinder and a separating section having twin side-by-side fore-and-aft separating rotors.
Figure 3:
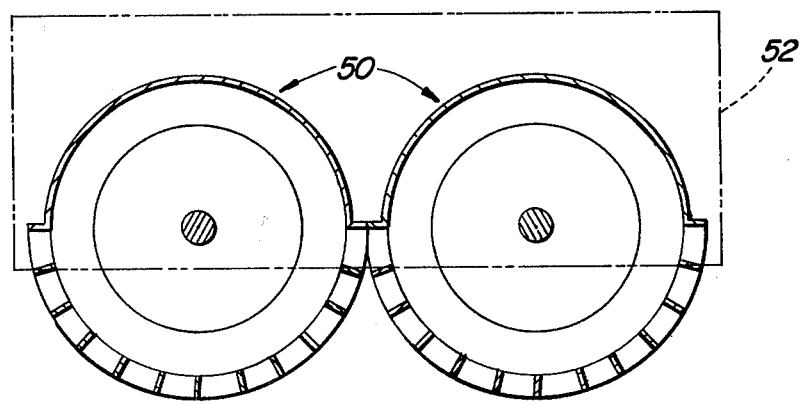
FIG. 3 is an enlarged schematic cross-sectional view of the twin rotor separator of FIG. 2 on line 3—3 showing the transverse threshing cylinder in phantom outline.

A separator embodying the invention may also be used advantageously in the combine environment represented by FIGS. 2 and 3, which differs from that of FIG. 1 principally in that a pair of side-by-side axial flow rotary separator portions 50 receive threshed crop material from a transverse tangentially fed threshing combination consisting of a cylinder 52 and concave 54. A beater 56 assists the delivery of threshed crop material to a forward upper inlet 58 of the separators 50, from each of which straw is discharged through an outlet 60.

The invention may be described with principal reference to a rotor, or intermediate portion of a rotor, cooperating with but not limited to a generally conventional separator housing without particular reference to inlet or outlet conditions of the separator or without particular reference to the general environment of the separator, such as those illustrated in FIGS. 1–3. In the remainder of the description, therefore, separator housing inlets and outlets will be depicted in simple semi-schematic form, not intended to suggest any particular limiting structural details or preferred form of inlet or outlet or to limit the separator to a particular form of mobile harvester or other environment. However, it should be noted that rotors according to the invention have particular merits and characteristics in receiving crop material at a separator housing inlet and in discharging it. In particular, smooth, positive and efficient material handling at inlet and outlet results when generally radially extending finger-like crop material engaging elements characteristically included in preferred embodiments of the invention are used.

Figure 4:
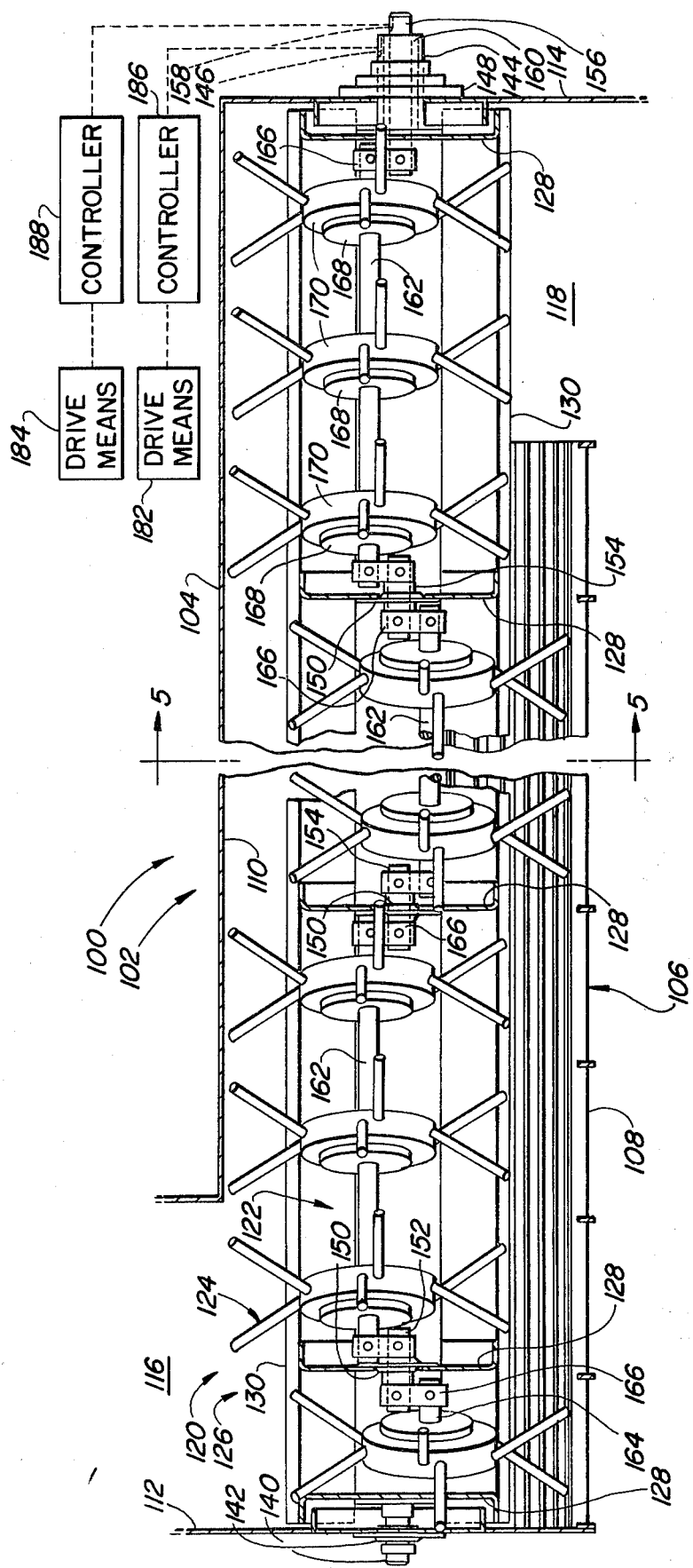
FIG. 4 is an enlarged side elevation of one half of the separator section of FIG. 2 with the separator housing sectioned on a longitudinal vertical plane to expose the rotor.

FIGS. 4 and 5 illustrate an embodiment of the invention which may be characterized as having rotor elements eccentric to a separator housing and moving in planes inclined to the axis of the housing. A generally cylindrical separator housing 100 includes a housing wall 102 having an upper imperforate portion 104 and a foraminous lower portion such as the conventional grate 106 shown. The inner surface of the upper wall portion 104 and the inner edges of the grate bars 108 are approximately concentric and will be described collectively as the housing inner wall surface 110.

For convenience in description, the separator of FIGS. 4 and 5 is assumed to be in an environment similar to that shown in FIG. 2 so that its axis is approximately horizontal and fore-and-aft extending. Thus, the ends of the housing are closed by forward and rearward bulkheads 112 and 114 respectively, which together with suitable interruptions in the housing wall 102, help define an upstream inlet 116 and a downstream outlet 118. The rotor assembly 120 extends within the housing with its longitudinal axis parallel to the housing axis and comprises a crankshaft assembly 122 carrying a series of relatively closely spaced finger wheel assemblies 124, surrounded by a drum or cage assembly 126.

The drum assembly 126 may be considered a skeleton cylinder in which four spaced co-axial bulkheads 128 support four equally circumferentially spaced axially extending slats 130, each with outwardly turned flanges 132, each carrying a wear strip 134 of a wear resistant and preferably somewhat resilient material, the facing walls 136 of each pair of wear strips 134 defining a longitudinal slot 138 extending the length of the drum assembly 126. The front end of the drum assembly 126 is concentrically journaled in the housing on a stub shaft 140 rigidly attached to the front drum bulkhead 128 and extending through a bearing 142 carried by the housing forward bulkhead 112. The rearmost bulkhead 128 of the drum assembly has rigidly attached to it a rearwardly extending bearing sleeve 144 including a conventional keyway 146 close to its free end and is journaled in a conventional flanged bearing 148, so that the rearward end of the drum assembly 126 is also supported concentrically in the separator housing 100. Each of the intermediate bulkheads 128 carry a bearing 150 co-axial with the drum.

The crankshaft assembly 122 serving at least in part as a rotor frame member is journaled in the drum assembly 126 by a series of short co-axial crank shafts or journals including a front journal 152, a pair of intermediate journals 154, all of which are free to rotate in the bearings 150 of their respective drum bulkheads 128. A rather longer rear journal 156 with a keyway 158 close to its rearward end, extends through and is journaled in (by a suitable anti-friction bearing 160), the rear sleeve 144 of the drum assembly 126.

The crankshaft assembly 122 has three throws, diametrically opposed as indicated in FIG. 4, made up of three crank pin portions 162, and an additional throw by a forwardly extending stub crank pin 164 at the front of the separator. The axis of each crank pin is considered to be a rotor portion principal axis, parallel to and offset from the housing axis. The crank pin portions 162 and 164 are connected rigidly to the journals 152, 154 and 156 by webs or cranks 166. Each of the crank pin portions 162 carries a plurality of evenly spaced finger wheel journals or finger wheel bearing inner races 168 and a single such journal is carried on the forward stub crank pin 164. The axes of these journals 168 are inclined, all at the same angle, to the axis of the crank pin portion to which they are rigidly attached, with the axes of the finger wheel journals 168 intersecting the axes of the crank pin portions 162 and 164. As indicated in FIG. 4, the axes of all finger wheel journals 168 are inclined in the same direction in relation to the crank pin portions on which they are carried when the relative (opposite) throws of the crank pin portions are taken into account. Expressed in another way, with respect to a plane common to the crankshaft journal axis (or housing axis) and the respective crank pin portion axis, all finger wheel journals 168 are inclined at the same angle and in the same direction so that the planes of the finger wheels 124 are parallel.

On each finger wheel journal 168, a finger wheel assembly 124 is free to rotate (suitable anti-friction bearings, not shown, may be used) with the general plane of the finger wheel perpendicular to the axis of the finger wheel journal 168. Each finger wheel is made up of a hub 170 with a radially extending concentric flange 172 (shown only in FIG. 5) against which are clamped with suitable clamping hardware 174, a set of four double fingers 176, each of which includes a pair of generally radially extending fingers 178, the tips 180 of which constitute the principal crop-engaging portions of the finger wheel assemblies and which extend through the slots 138 of the drum assembly 126. As best seen in FIG. 5, the form of each double finger 176 is such that the juxtaposed fingers 178 in each slot 138 diverge somewhat with a fork effect. The finger wheel 124, in major part, may be considered an intermediate or transfer rotor element carrying crop material engaging elements (tips 180 of the fingers 178).

In this embodiment and those described below, the crop material engaging elements are indicated to be of circular cross section and radially extending but are not limited to this form. Preferably each element is of relatively small cross section with an extremity shaped so as to minimize compression of the crop mat on entry. Cross sections may, for example be oval to improve bending strength in the "working" direction of the element and other forms may be devised to improve crop stripping or release and minimize friction in engaging and disengaging the crop material mat.

Conventional drive means, shown schematically only in FIG. 4, are connected to the drum assembly 126 and crankshaft assembly 122 by means of the keyways 146 and 158 respectively, so that they may be rotated, driven independently at desired speeds and directions of rotation. The drives to the drum assembly 126 and crankshaft assembly 122 each include a drive means 182 and 184 respectively, and a controller 186 and 188 respectively. The drive means may be, for example, conventional variable speed V-belt drives or hydrostatic drives including or connected to a power source on the combine with the controllers permitting an operator to adjust relative speeds of rotation to suit crop conditions or possibly to reverse directions to clear a blockage. Alternatively, if the drives were conventional chain and sprocket or gear drives, drive changes would be obtained by changing sprocket or gear sizes as required.

FIGS. 6, 7, 8 and 9 cover two variations on the inclined plane eccentric rotor element embodiment shown in FIGS. 4 and 5 and just described. As can be seen in the semi-schematic partial side view of FIG. 6, these variations have much structure in common or closely analogous to the embodiment just described. Such portions of the structure will be designated with numerals having the same last two digits as corresponding items in FIGS. 4 and 5 and unnecessary repetition of description will be avoided.

The fixed separator housing 200 has a generally cylindrical wall 202 with an inner surface 210 and a downstream outlet 218. A rotor assembly 220, with its axis parallel to the axis of the housing 200, includes a crankshaft assembly 222 serving at least in part as a rotor frame member, a plurality of finger wheel assemblies 224 and a drum assembly 226. The drum assembly 226 is concentric with the housing wall 202 and includes longitudinal slots 238 to accommodate the fingers 278 of the finger wheel assemblies 224. A carrying or bearing sleeve 244 is journaled in a flange bearing 248 at the rearward end of the separator. The drum assembly 226 is rotatably driven by drive means 282 connected to the sleeve assembly 244.

The rear journal portion 256 of the crankshaft assembly 222 is carried for rotation extending through and concentric with the drum sleeve 244 by bearings 260. The crank pin 262 is connected to the crank rear journal 256 by a crank 266. The finger wheel assemblies 224 are mounted for rotation on oblique axis journals 268 integral with or rigidly attached to the crank pin 262. The finger wheel assemblies 224 have a plurality of generally radially extending spaced finger-like elements 278 with outer crop engaging portions 280 and lying in a plane perpendicular to the axis of the finger wheel journal 268 and rotatably mounted on those journals by means of, for each finger wheel assembly, a finger wheel hub 270 and finger wheel bearing 271. Again, a finger wheel assembly 224, may be considered in major part as an intermediate rotor element carrying crop material engaging elements (outer portions 280 of fingers 278).

The principal operational difference between the embodiment of FIGS. 4 and 5 and those of FIGS. 6-9 is that in the latter, no means is provided for revolvingly driving the crankshaft assembly 222. In the operating mode, the crank pin or crank pin portions 262 remain in a fixed relationship to the housing axis or the housing wall. However, FIGS. 6-9 exemplify structure for adjusting the position of the crank pin center or centers and for rotationally adjusting the crank pin or pins 262 so as to change the timing or relationship of the axes of the finger wheel journals 268 to the common plane of each crankshaft throw—that is the plane in which lie the axes of a given crank pin portion 262 and the crankshaft journals, such as rear journal 256. Preferably in this embodiment, the crankshaft assembly would have a single throw—that is all crank pin portions 262 would be co-axial.

Figure 8:
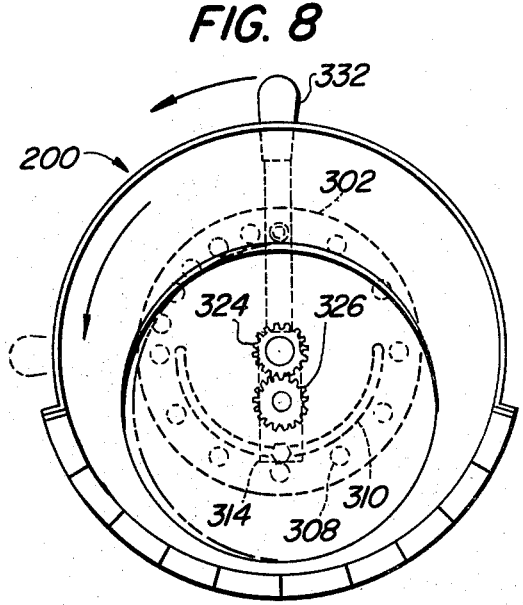
FIG. 8 is a partial schematic cross-sectional view of the embodiment of FIG. 6 approximately on line 8—8 to illustrate the finger wheel plane of rotation adjustment.
Figure 9:
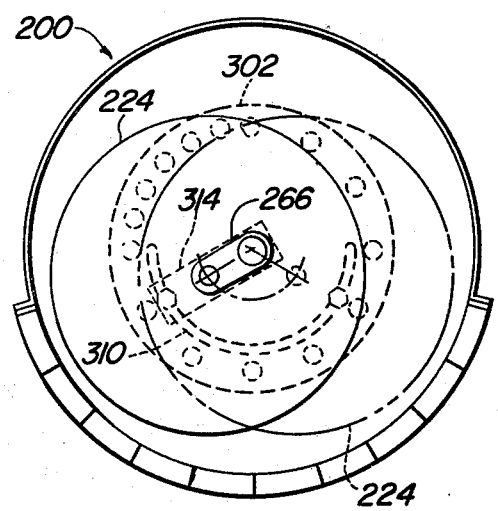
FIG. 9 is a view similar to FIG. 8 to illustrate the finger wheel center position adjustment.

Exemplary structure to accomplish these alternative modes of operation will now be described. A control or adjusting assembly 300 is mounted on the rear bulkhead 214 of the separator housing 200. A bracket assembly 302 attached to the housing wall 214 has a rearward face 304 approximately parallel to and spaced from the housing wall 214. The rear journal 256 of the crankshaft assembly extends through a boss 306 integral with the bracket face 304. An array of adjustment holes 308 form a circle in the bracket face 304 concentric with the boss 306 as indicated in FIG. 8 and 9. In the lower half of the bracket face 304, an adjustment slot 310, also concentric with the boss 306, extends over an arc of about 180 degrees.

The rear crankshaft journal 256 is modified to have an axial through bore 312 and, at its rearward end, a flange or lug 314 adjacent the rearward side of the bracket face 304 and extending beyond the slot 310. A suitable clamping or locking arrangement such as the nut and bolt assembly 316, shown and seen best in FIG. 6, is used to fix the rotational position of the flange 314 relative to the bracket face 304. The crank 266 is provided with a bore 318 co-axial with the crankshaft 262. A control shaft 320 extends through the rear crankshaft journal bore 312 and has a transverse pin bore 322 at its rearward end and a control shaft gear 324 rigidly attached at its front end. The attachment of the crank pin 262 to the crank 266 is modified so as to permit rotation of the crank pin 262 relative to the crank 266 and includes a spur gear 326 meshing with the control shaft gear 324 and journaled in the crank bore 318 by a crankshaft stub shaft 328.

Rotational adjustment of the crankshaft 262 is effected by a lever assembly 330 including a lever 332 secured to the control shaft 320 by a pin 334 and set and held in a desired position by engagement of a detent assembly 336 with one of the several holes 308 in the bracket face 304. Moving lever 332 through 90 degrees, for example, as indicated in FIG. 8, transmits through the gears 324 and 326; if of the same size an opposite 90 degrees rotation to the crank pin 262 changing the alignment of the finger wheels from that shown in FIG. 6 to that of FIG. 7.

To adjust the revolved position of the crank pin 262, the clamped flange 314 is released and swung to a desired position (as permitted by slot 310). Adjustment of the crankshaft assembly 222 from a bottom dead center position to an alternative position is illustrated between FIGS. 8 and 9.

Other embodiments of the invention will be described, but first some general principles of operation and adjustment referring particularly but not exclusively to the embodiments exemplified in FIGS. 4-9 will be discussed with reference to FIGS. 10-21.

Figure 10:
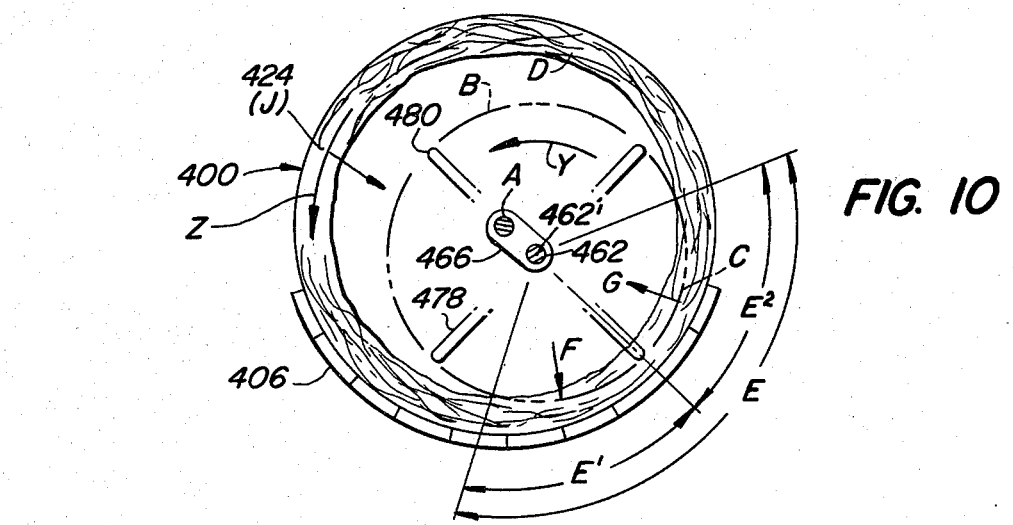
FIG. 10 is a schematic representation of a cross-section of a separator assembly to illustrate relationships between rotor elements and a crop material mat in the separator housing, related but not limited to the embodiments of FIGS. 4–9.

First, some structural elements, and operational assumptions, exemplifying aspects of the present invention are represented schematically in FIG. 10. In a generally cylindrical housing 400 which may have a grate portion 406, a rotor element 424 is carried for rotation about a center 462' offset from the center A of the housing. The rotor element 424 which may be considered in major part an intermediate or transfer element, preferably includes a plurality of spaced apart finger-like elements 478 and the rotor system includes means for rotating the rotor element (not shown in FIGS. 10-18), for example, in the direction shown by the arrow Y whereby the radially outward portions 480 of the finger-like elements 478 describe a circular path B within the housing 400 and approximately tangential to it at a tangent point C (actually the point of minimum clearance between the fingers 478 and the housing 400 but called tangent point for convenience).

It is assumed that a flow of crop material (mog) from which grain is to be separated has been introduced into the housing, has been engaged by the crop material engaging elements 480 carried by the rotor element 424 and reached a steady state condition in which the mog is distributed around the housing in a continuous mat D of approximately uniform thickness, propelled circumferentially around the housing in the direction indicated by arrow Z by engagement with the fingers 478 and maintained in contact with the inner surface of the housing wall by the action of centrifugal force.

It is also assumed that the periphery B described by the rotor element 424 is of such diameter and the mat thickness is such that direct contact of any one finger-like element 478 with the mat D has a particular limited arc of engagement E including an engaging phase E1 during which the outward portion 480 of the finger-like element 478 penetrates the mat generally radially (see arrow F) and preferably without compressing it and a disengaging phase E2 in which the finger element 478 withdraws generally radially from the mat (see arrow G).

In a particular embodiment, the rotor element 424 may be journaled on a crank pin 462 which is supported by and spaced from the housing center A by a crank 466. Means may be provided for adjustably rotating the crank pin 462 with respect to the crank.

In other embodiments, the crank 466 may be made adjustably revolvable with respect to the housing center A, thus providing an adjustment range for the position of the center 462' of the rotor element 424.

In another embodiment, means may be provided for drivingly revolving the crank 466 about the center of the housing A, so that the rotor element 424 (and the arc of engagement E and the tangent point C) move around or orbit the inside of the housing 400.

Embodiments are possible in which the variations just described (rotationally adjustable rotor element crank pin, revolvably adjustable crank and revolvingly driven crank) are used together in various combinations with the basic structures of housing, intermediate rotor element (carrying crop material engaging elements), and drive means for the rotor element.

So far the elements of the mechanism have been considered only with respect to a plane perpendicular to the axis of the housing and in terms of circumferential propulsion of the mat D by the rotor element 424. Now with reference to FIGS. 11 through 18, we will consider some aspects of axial propulsion or indexing of the mog mat.

Figure 11:
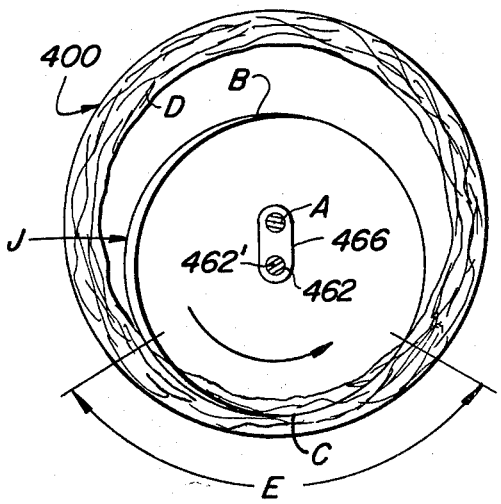
FIGS. 11–18 is a series of pairs of schematics of separator cross-section and side elevation of a single finger wheel to illustrate the axial indexing effect of a finger wheel with particular reference to the embodiments of FIGS. 4–9, in various positions and adjustment conditions.
Figure 12:
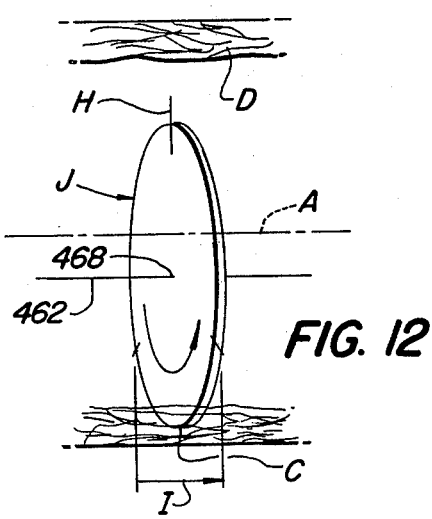

FIG. 11 shows, schematically, a particular configuration of a separator according to the invention, in which the rotor element center 462' is immediately below the housing center A. For illustrative purposes in the remainder of this portion of the description, the rotor element 424 will be regarded as a thin circular disc J (shown, in FIG. 10, with the plane of the disc perpendicular to the housing axis) rotatable about an axis of rotation 468 (not shown in FIG. 10) intersecting the crank pin 462. Clearly, such a disc rotated normally about the crank pin 462 as in FIG. 10 would propel material only circumferentially. However, if the disc is pivoted on a vertical diameter H, passing through the axis A of the housing 400 and the tangent point C as indicated in FIGS. 11 and 12, then clearly the arc of engagement E takes on an axial dimension corresponding to the vector I (when direction of rotation is as indicated). The rotor element 424 then has a potential for axial propulsion or indexing which may be assumed to be proportional to the vector I. (A similar condition is shown in FIG. 7.)

Figure 13:
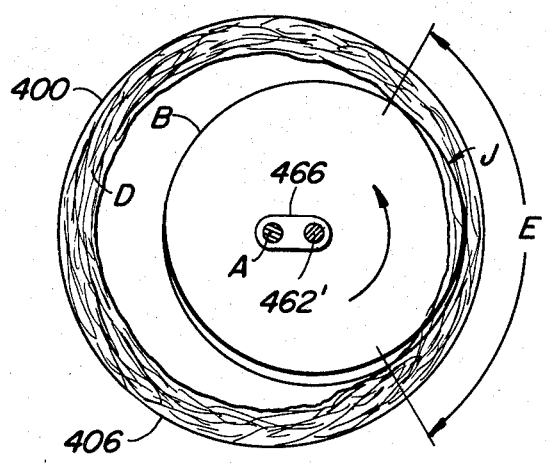
Figure 14:
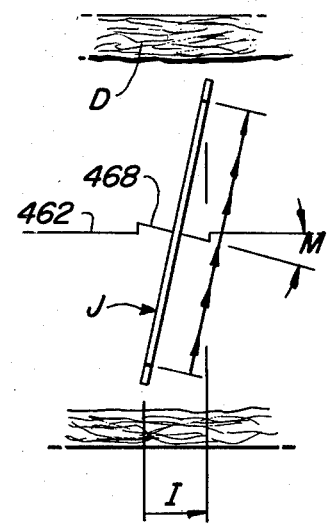

In FIGS. 13 and 14, the condition of the mechanism is the same as in FIGS. 11 and 12 except that the crank 466 has been revolved 90 degrees into a new fixed position. The arc of engagement E is in a new location but the net indexing effect remains the same as indicated by the projection of the arc of engagement E into the horizontal plane, vector I.

Figure 15:
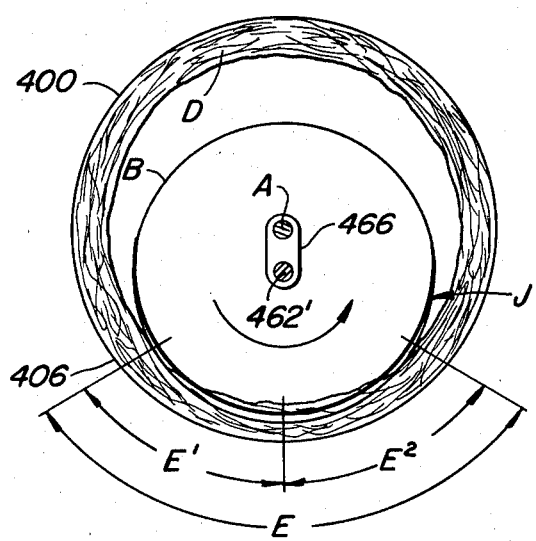
Figure 16:
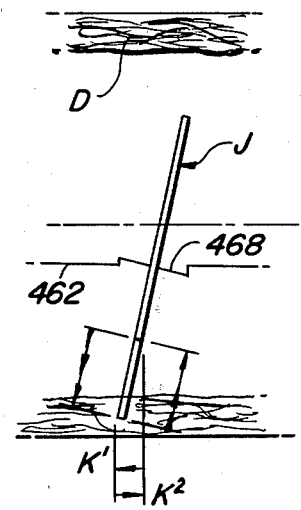

In FIGS. 15 and 16, the conditions are again the same as in FIGS. 11 and 12 except that the crank pin 462, while remaining at bottom dead center, has been rotated 90 degrees so that the axis of rotation 468 of the rotor element 424 (which is assumed to be fixed in relation to the crank pin 462) and hence the plane of rotation of the rotor element 424, (disc J) assumes a new attitude relative to the housing 400 as indicated in FIG. 16. In the engaging phase E1 of the arc of engagement E, there will be a net indexing effect of the rotor element on the mog proportional to the vector K1 and in the disengaging phase, an equal but opposite effect, vector K2, with a net effect of zero. (A similar but oppositely inclined condition is shown in FIG. 6.)

Figure 17:
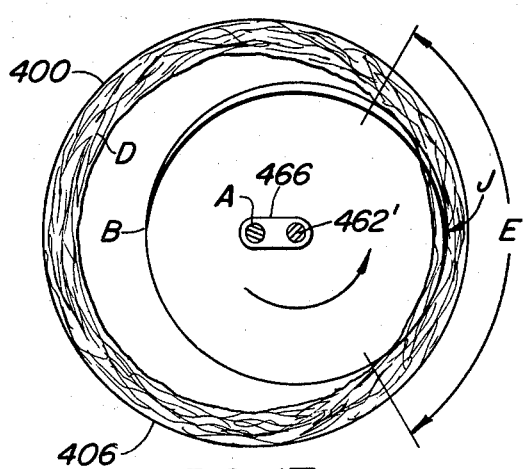
Figure 18:
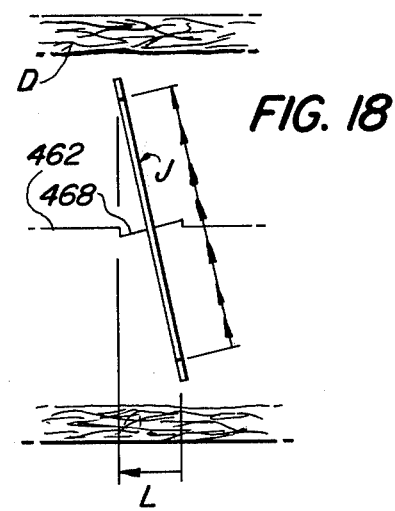

FIGS. 17 and 18 illustrate the result obtained when the condition of FIGS. 13 and 14 is modified by rotating the crank pin 462 through 180 degrees—a reversal of axial indexing direction, (vector L).

Figure 19:
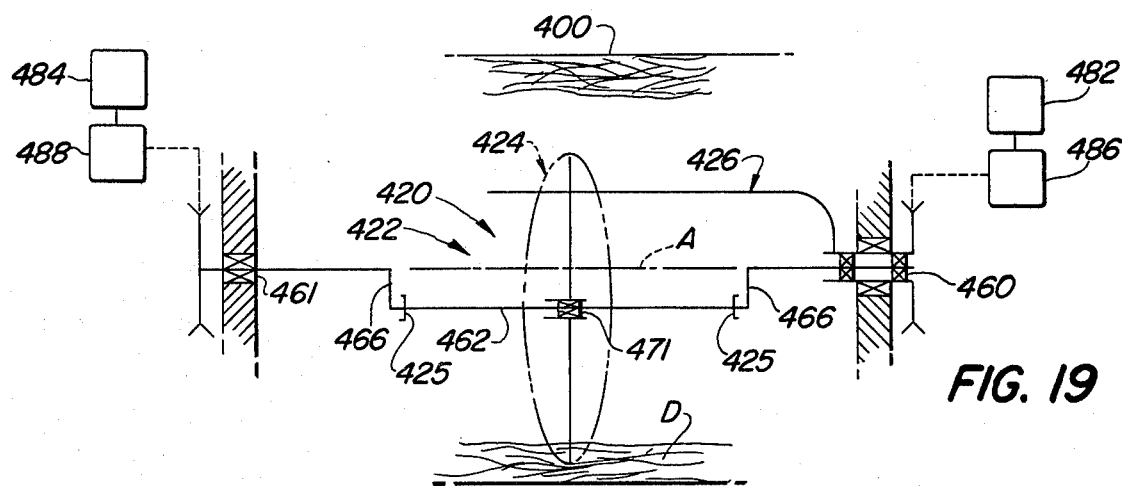
FIGS. 19 and 20 are a schematic representation of the mechanism of the embodiment of FIGS. 4 and 5 with the crankshaft assembly shown in two instantaneous positions 90 degrees apart.
Figure 20:
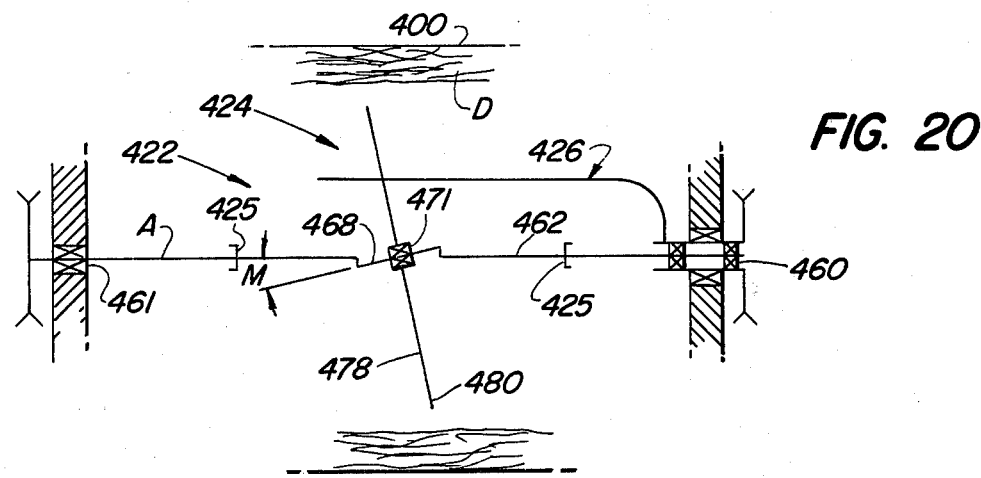

In the schematics of FIGS. 19 and 20, the elements of mechanism just described are shown with additional structural definition. Included are fixed bearings 460 and 461 for journaling a rotor assembly 420 within a housing 400, the rotor assembly including a crankshaft assembly 422 supporting and journaling a rotor element 424 (only one shown) which is drivingly rotated by, or the rotation of which is controlled by, a rotor element control 426, engaging the rotor element or rotor assembly.

The crankshaft assembly 422 includes a crank pin portion 462 having an essentially integral rotor element bearing or journal portion 468 whose axis inclined at an angle M to the axis of the crankshaft 462. Releasable couplings 425 permit rotational adjustment between the crank pin 462 and the cranks 466. Note that in the configuration schematically depicted in FIGS. 19 and 20, the axis of rotation 468 of the rotor element 424 lies in a plane perpendicular to the plane of the crankshaft assembly 422 (or cranks 466). This particular condition of timing is that for maximum potential axial indexing effect for a given angle of inclination M.

Input for rotationally driving or controlling the rotational position of the rotor assembly 420 through the rotor element control 426 is by drive means 482 and controller 486. Input for drivingly revolving, or controlling the rotational position of, the crankshaft assembly 422 is through a drive or control system such as drive means 484 and controller 488, indicated schematically in FIGS. 19 and 20.

The foregoing discussion explains how an adjustable net axial indexing effect derives from a rotor crop-engaging element having, or controlled by an intermediate element having, an inclined axis of rotation eccentrically mounted in a separator housing. Because of the eccentricity, crop-engaging elements of the rotor element engage a crop mat in the housing only intermittently or with varying depth of engagement but with an aggregate effect sufficient to propel the crop mat circumferentially at such a speed that it substantially maintains contact with the inner surface of the housing wall through centrifugal effect.

Figure 21:
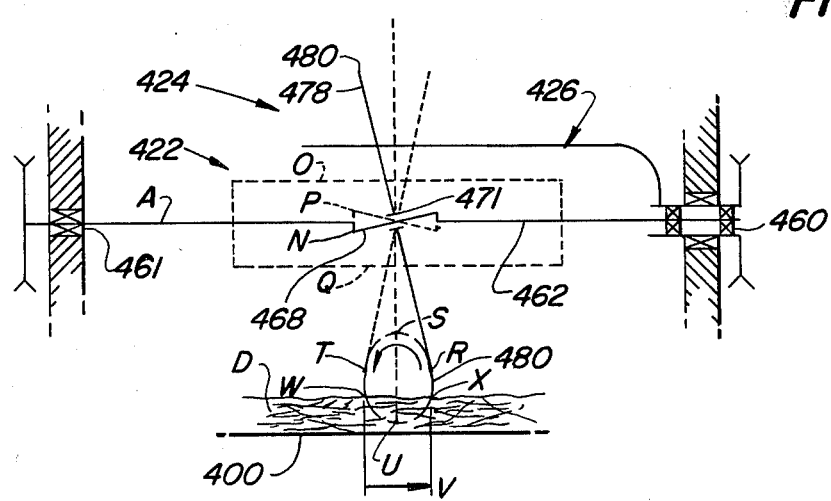
FIG. 21 is a schematic similar to FIGS. 19 and 20 to illustrate an aspect of the axial indexing potential of the mechanism.

Understanding of the axial propulsion potential of the mechanical elements just discussed and summarized in FIGS. 19 and 20 may also be gained from a consideration of FIG. 21 where it is assumed that the rotor element 424 is not rotating, but is stationary, controlled by the control element 426. It is assumed that as the crankshaft assembly 422 is rotated, the rotor element 424 tends to rotate with it because of friction at the bearing axis 468, but is engaged by the control element 426 so that its rotation is arrested. Then as the rotation of the crankshaft assembly 422 continues, the crank pin 462, carrying the rotor element 424, revolves around or orbits the housing axis A. There is thus relative rotation between the rotor element 424 and the crank pin 462 and, because of the inclined axis of rotation 468 of the rotor element 424, oscillation of the rotor element with respect to the control element 426 and to the housing 400.

The cardinal points in one orbit or cycle of rotation of the crank pin 462 about the housing axis A are indicated in FIG. 21 by the letters N, O, P and Q respectively and the corresponding points in the approximate locus of the outer portion 480 of a finger-like generally radially extending crop engaging element 478 of the rotor element 424 are indicated by the letters R, S, T and U.

While in engagement with the mat D, that portion of the locus between W and X, the axial component of movement of the crop-engaging element outer portion 480, is always in the same direction as indicated by the vector V. FIG. 21 illustrates that with a mechanism of the general form described, offering intermittent engagement (or varying penetration) of a crop material mat, it can be arranged that the net effect is to index or move the portion of the mat engaged always in the same axial direction. This will be true even if the crop-engaging element does not withdraw completely from the mat during a cycle of operation. It follows that the axially indexing effect of a crop-engaging element, such as 480 in FIG. 21, will be maintained when both the crankshaft assembly 422 and the controlling or driving element 426 are rotated as long as there is relative rotation in the appropriate direction between them. Clearly, in such combined rotation, the locus or path of an engaging portion, such as the outer portion 480, while in engagement with the mat D as indicated, between W and X, will be generally helical in relation to the housing, combining axial and circumferential propulsion of the crop material mat so engaged.

It is characteristic of an operaing mode in which the crankshaft assembly (for example, 122 in the embodiment of FIG. 4) is revolvingly driven that the arc of engagement of the crop material engaging elements with the mat is constantly in motion over the housing wall inner surface so as to, depending on finger wheel spacing, virtually sweep the entire housing and avoid "dead spots". Separation efficiency may be enhanced in that the balance between centrifugal force and gravity will also vary for the engaged and disengaged portions of the mat as it is propelled circumferentially in the housing. Given that a certain minimum peripheral speed of the crop engaging elements relative to the housing surface is necessary to maintain the crop material mat against the housing wall and that a certain relative rotational speed between rotor elements and crankshaft assembly is necessary to achieve a desired axial indexing effect, then the crankshaft assembly may be revolved in the same direction as or opposite to the direction of the rotor elements, so that correspondingly, the arc of engagement may move with or against the circumferental direction of the crop material engaging elements.

Figure 22:
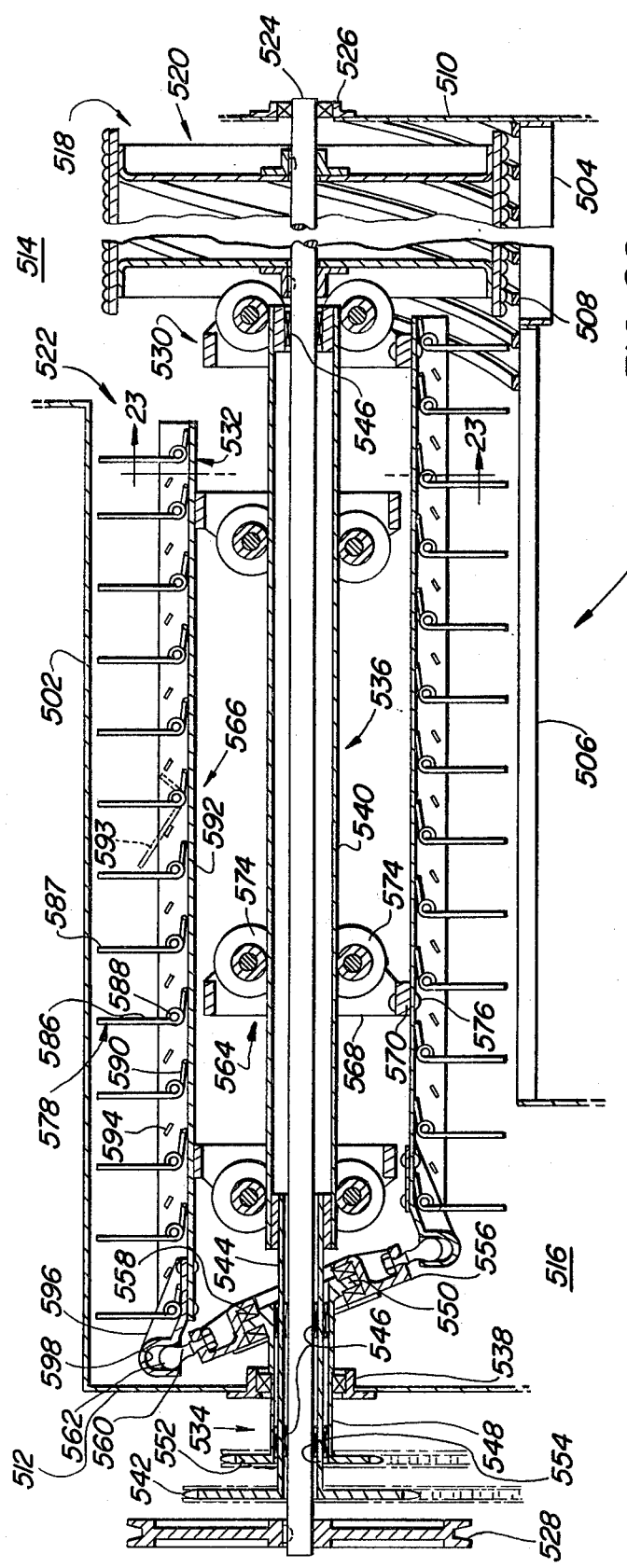
FIG. 22 is a view similar to FIG. 4 but with the rotor also in longitudinal section of an embodiment of the invention comprising axially reciprocating bars with hinged fingers.
Figure 23:
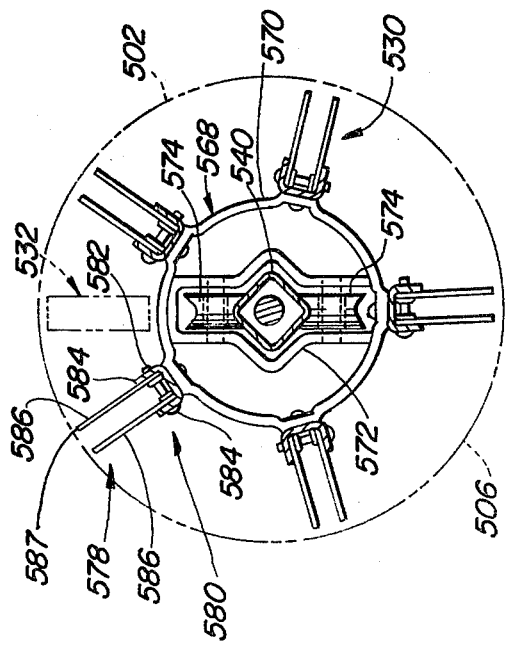
FIG. 23 is a partial cross-sectional view on line 23—23 of FIG. 22.

FIGS. 22 and 23 illustrate a further embodiment of the invention, where the intermittent engagement of a crop-engaging element with a mat of crop material on the inner wall of a separator housing derives from a hinged member on a concentrically orbiting and reciprocating element. The source or generator of intermittent engagement is, as it were, an extra degree of freedom (represented by the hinged finger) not present in the embodiments so far described, where simple eccentricity generates the intermittent engagement. However, it will become clear that in an embodiment of this general type some eccentricity could be tolerated and may in some applications be advantageous.

The embodiment of FIG. 22 and those already described are similar in that an intermediate rotor element, journaled on an axis oblique to the housing, is connected to and generates axial reciprocation for a plurality of crop material engaging elements. Among advantages of this particular embodiment are the facilitating of providing relatively large concentrations of crop material engaging elements (such as fingers) in applications where this may be desired.

The embodiment is illustrated with co-axial threshing and separating sections concentrically contained in a housing assembly 500 having a generally cylindrical wall consisting of an imperforate upper portion 502 and lower foraminous upstream threshing and downstream separator grate portions, 504 and 506 respectively, the threshing grate 504 having raised helical guide vanes 508 on its inner surface. The ends of the separator housing assembly 500 are closed by upstream and downstream bulkheads 510 and 512 respectively, and the housing walls are interrupted to provide an upstream inlet 514 and a downstream outlet 516.

Although relatively slower peripheral speeds may be desirable and effective in a rotor separating portion, relatively higher peripheral speeds may often be more effective in a rotor threshing portion. The embodiment of FIG. 22 exemplifies means for optimizing the respective speeds of rotor threshing and separating portions by providing independent drives. In particular, it is characteristic of separator rotors according to the invention that, because of their positive, low slip conveyance of crop material, given throughput rates are possible with rotor speeds, and, hence power consumption, relatively much lower than with conventional rotors.

The rotor assembly 518 is constructed so that its co-axial threshing and separating portions, 520 and 522 respectively, may be driven at different rotational speeds. The rotor threshing portion 520 is keyed to a rotor shaft 524 which is co-axial with the housing wall 502 and grate 504 and journaled at its upstream end in the upstream bulkhead 510 by bearing 526. The downstream end of the shaft 524 extends from the separator casing and has keyed to it a V-belt sheave 528 to receive and transmit power to the rotor threshing portion 520. The guide vanes 508 cooperate with the rotor threshing portion 520 to feed crop material downstream to be engaged by the rotor separating portion 522.

Twin co-axial counter-reciprocating finger bar drum assemblies 530 and 532 carry the principle crop-engaging elements of the rotor separating portion 522. A wobble plate assembly 534, also serving, at least in part, as a rotor frame member provides reciprocation for the drums, and they are rotationally driven through a hollow drum drive shaft assembly 536 which also provides a reciprocating bearing surface for the reciprocating elements. The wobble assembly 534 and the drum drive shaft assembly 536 are both concentrically sleeved and journaled on the separator shaft 524. Support for the downstream end of the rotor assembly 518 and rotor shaft 524 comes from a downstream rotor bearing 538 mounted in the housing downstream bulkhead 512.

The rotor separator portion drive shaft assembly 536 is made up of a square tube 540 extending substantially the length of the body of the rotor separator portion and connected to a drive sprocket 542 by a tubular journal or sleeve 544 extending through the downstream bulkhead 512. The rotor tubular drive shaft assembly 536 is concentrically rotatable on the rotor shaft 524, journaled by three spaced anti-friction bearings 546.

In the wobble assembly 534, a sleeve or journal 548, extending through a downstream bulkhead 512, in which it is directly journaled by the bearing 538, carries rigidly at its inner end an inclined wobble plate or disc 550 and at its outer end, a drive sprocket 552. A pair of anti-friction bearings 554 permit rotation of the wobble assembly 534 concentrically about the drum drive shaft assembly 536. The wobble output assembly 56 (which may be considered an intermediate rotor element), shown only in FIG. 22, is co-planar with the wobble disc 550 and free to rotate annularly on the wobble disc 550 by virtue of a conventional combined radial and thrust bearing arrangement 558. It carries a pair of diametrically opposed drive members 560 extending radially, each having a spherical extremity 562.

The two five bar finger drum assemblies 530 and 532 each are made up of a pair of axially spaced slat drum assemblies 564 and a set of five identical slat assemblies 566 and differe only in the axial location of their drum assemblies 564 in relation to the slat assemblies 566. Only one drum assembly (530) will therefore be described.

Each slat drum assembly 564 is mounted for reciprocation on the square tube 540 of the drum drive shaft assembly 536, and it consists essentially of a generally circular slat drum 568 with a peripheral annular flange 570 and, journaled in a suitably-shaped generally diametrical opening 572, a pair of rollers 574 whose V-grooves engage opposite corners of the square tube 540 permitting rolling reciprocation of the slat drum assembly 564 on, but not rotation about, the tube 540. The five identical slat assemblies 566 of the five bar drum 530 are rigidly attached by suitable means, such as the rivets 576 shown, to the annular flanges 570 of the two slat drum assemblies 564, circumferentially equally-spaced and parallel to the housing axis and of course concentrically disposed about that axis.

In each slat assembly 566, a plurality of axially spaced double fingers 578 are pivotally retained in the channel-shaped slat 580, each by a pin 582, extending through the opposite radially extending side walls 584 of the channel. Each finger may be made of a single piece of round cross-section material wound so as to provide two side-by-side fingers 586 each finger 586 having an outer portion 587, a hinge portion 588 to accept the pin 582, and a foot portion 590. When mounted in the channel, each finger 578 is free to pivot about its pin 582 and is shaped so that pivoting in a downstream direction is stopped by the foot portion 590 engaging the floor 592 of the channel with the fingers themselves 586 extending approximately radially. Lugs or stops 594 (seen best in FIG. 22) extending inward from the channel walls 584 are positioned to limit the retraction or folding down of the crop-engaging finger portions 586 to some such inclined position as that shown in FIG. 22 at 593.

In each five bar drum assembly 530 and 532, a reciprocating drive connector 596, connected rigidly to one of the slat assemblies 566, extends forward to engage, by a suitably-shaped socket 598, the spherical end portion 562 of one of the drive ball elements 560 of the wobble assembly 534. As can be appreciated from FIGS. 22 and 23, the two five bar drum assemblies 530 and 532 are axially substantially co-extensive, their inherently balanced counter reciprocation being permitted by the timing indicated in FIG. 23 and by suitable axial spacing of the slat drum assemblies 564 to avoid interference of the drum assemblies, one with another, as they reciprocate. Other feasible separator configurations using this rotor principle may include, for example, parallel side-by-side units, each with a single reciprocating rotor portion, but again counter reciprocating for balance purposes.

The potential for a ratchet-like feeding action of each five bar drum or rotor portion assembly 530 and 532 will be apparent from the drawings and above description. The use and operation of a wobble disc arrangement for translating rotary motion into linear reciprocating motion is well known, examples being certain types of hydraulic pump and reciprocating mower drives. However, some particular observations on the characteristics of the embodiment shown in FIGS. 22 and 23 may be made with reference to FIGS. 24 and 25.

It is the nature of the mechanism employed in the articulated or variable geometry rotor arrangement of FIGS. 22 and 23, where both the wobble element (534) and the element (five bar drum assemblies 530 and 532) which reciprocates are rotatable about a common axis, that one relative revolution between the two elements results in one cycle of oscillation or reciprocation. One such cycle is presented in FIG. 24 where the essentials of the mechanism are represented schematically. A wobble element 534', mounted co-axially in a separator housing 502', has an output element 556' to which is connected a finger-like crop material engaging element 586'. The finger element 586' is freely pivoted to the output element 556' but stops are provided limiting the pivoting range of the finger from a substantially radially outwardly extending position to a second position extending outward but also inclined in the direction of intended conveying of crop material. It is assumed that the mechanism is driven so that as the finger element hinge 588' is rotated concentrically within the housing 502', crop material is being propelled through the housing by a plurality of fingers 586' intermittently engaging the material, the material being distributed in a generally uniform mat maintained substantially in contact with the housing by centrifugal force. However, the axial component of the action of a single hinged finger element 586' may be examined, as if its rotary motion was stopped, during one relative revolution of the wobble element 534'. This is shown schematically in FIG. 24, for both the conveying stroke direction g of one finger and the return stroke of an opposite finger, direction h.

Figure 24:
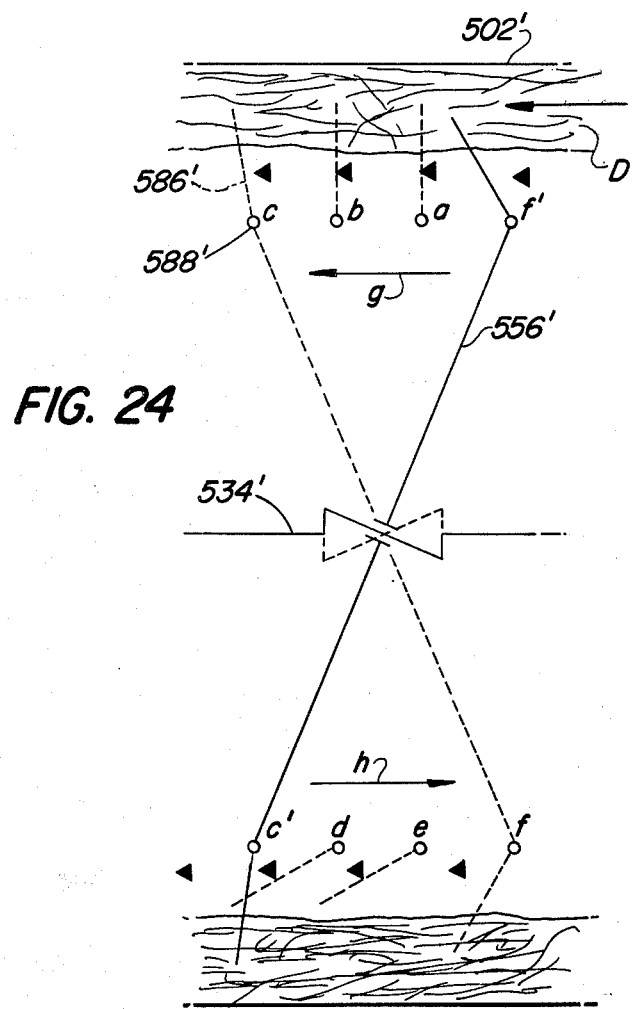
FIG. 24 is an enlarged schematic partial side elevation of the essentials of the mechanism of FIG. 22 to illustrate its axial indexing potential.

For a portion of the conveying stroke, for example between a and b, the finger is fully erect against its stops and in maximum engagement or penetration of the crop material mat D (upper portion of FIG. 24). However at point c (reversal of direction) the finger is somewhat inclined in the direction of conveying due to a combination of the deceleration and reversal of the linear motion and the inertia of the crop material mat D and the finger itself. In the return motion indicated in the lower portion of FIG. 24, direction h, the point of reversal of direction is indicated by c' with the finger in the same partially inclined attitude. In an intermediate portion of the return stroke (d to e) the finger will be fully folded or hinged in against its stops, a position reached from a combination of influences of finger inertia in the reciprocating direction and relative axial motion between the finger and the mat D as the finger disengages from the mat. At f the point of reversal from the return stroke, deceleration and inertia causes the finger to begin to hinge outwards into a more nearly radial position to engage the mat D and at some intermediate point a on the conveying stroke, reaches a fully radial position again (upper portion of FIG. 24).

Figure 25:
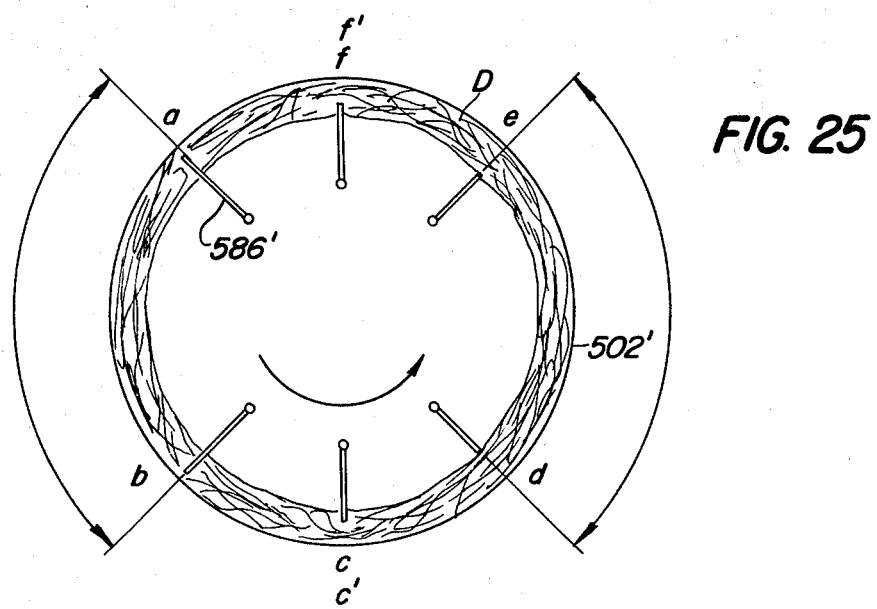
FIG. 25 is a schematic cross-sectional view showing the attitude of a single hinged finger in circumferentially spaced positions around the housing, engaging and disengaging the crop material mat, corresponding to the schematic of FIG. 24.

FIG. 25 presents essentially the same analysis of finger action as FIG. 24 except that here an end view shows the finger in positions a through f (f') as the finger revolves in the housing, its hinge 588' moving concentrically with the housing axis. It is also assumed (in FIG. 25) that for each actual revolution of the finger, there is one relative revolution of the wobble element 534' so that one cycle of oscillation or reciprocation of the finger occupies one complete revolution of the finger. FIG. 25 makes clear the intermittent engagement of the finger with a mat D. In the conditions assumed there is a constant maximum engagement between a and b and complete disengagement between d and e with arcs of respectively decreasing and increasing engagement between b and d, and e and a. Clearly relative rotational speeds could be chosen such that two or more cycles of engagement would occur for each actual revolution of a finger in the housing. Clearly during an engagement period or arc such as ab, the finger is propelling a portion of the crop material mat both circumferentially and axially so that that portion of the mat will follow a generally helical or spiral path with respect to the housing 502'. The aggregate effect of a plurality of fingers in the mechanical arrangement of FIGS. 22 and 23 will be to move the entire mat through the housing in a generally spiral fashion.

In an axial indexing mechanism of the general type of FIGS. 22 and 23, the reciprocation stroke must of course be greater than the maximum possible axial displacement of the tip of the hinged or folding element relative to its hinge in order for the element to gain a "purchase". In any given mechanism in a particular application, the net axial indexing effect will naturally depend on a number of variables such as operating speed and mat thickness. In the mechanism itself, performance will be affected by choices made in the balance of the folding element. For example, the foot 590 may be counterweighted so as to increase the inertia effect tending to move the finger 578 between its radial and folded positions as it is reciprocated, but of course the center of gravity of the finger must always be radially outwards of its pivot.

Figure 26:
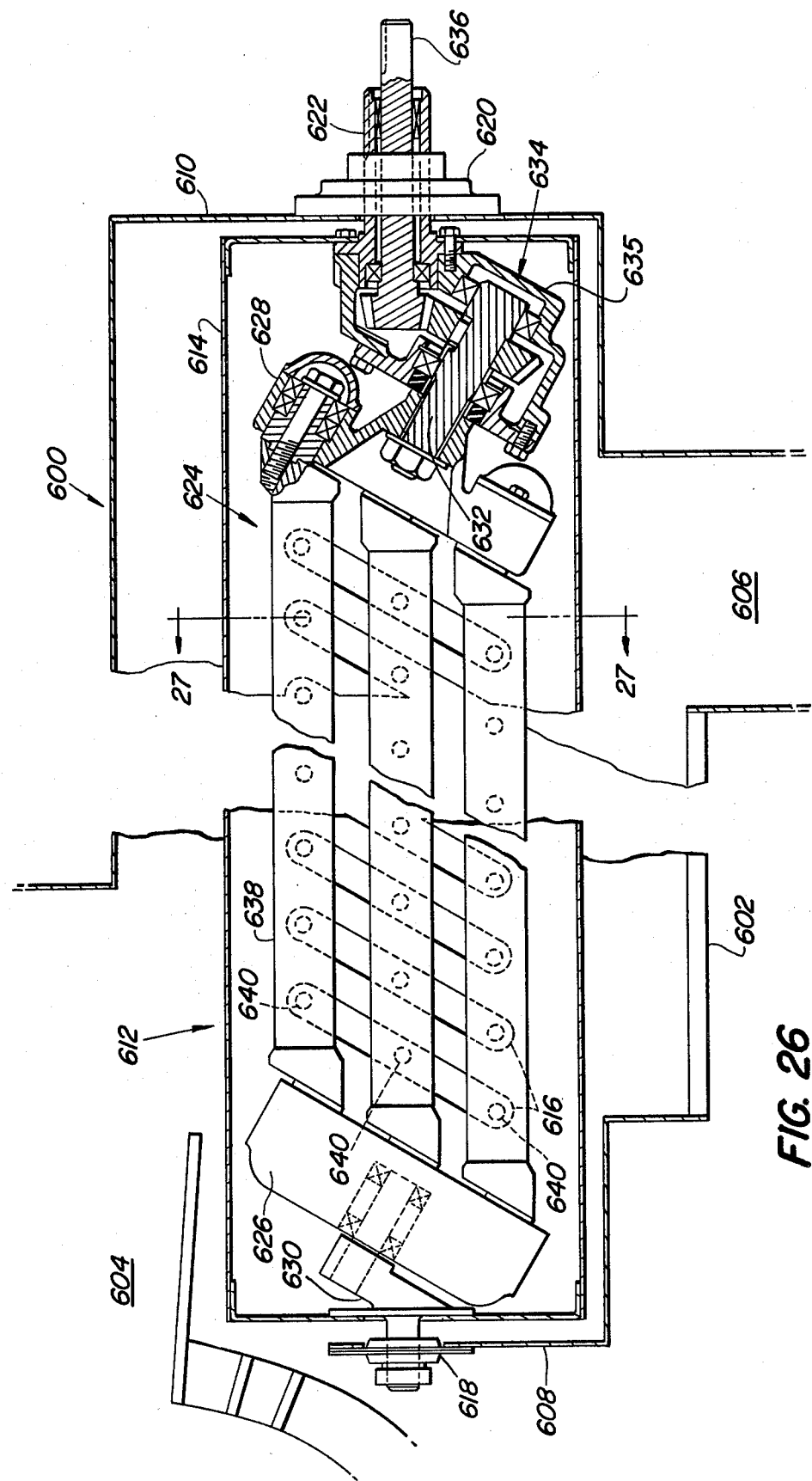
FIG. 26 is a view similar to FIG. 4 of another embodiment of the invention in which a rotary parallel bar mechanism is used in the rotor assembly.
Figure 27:
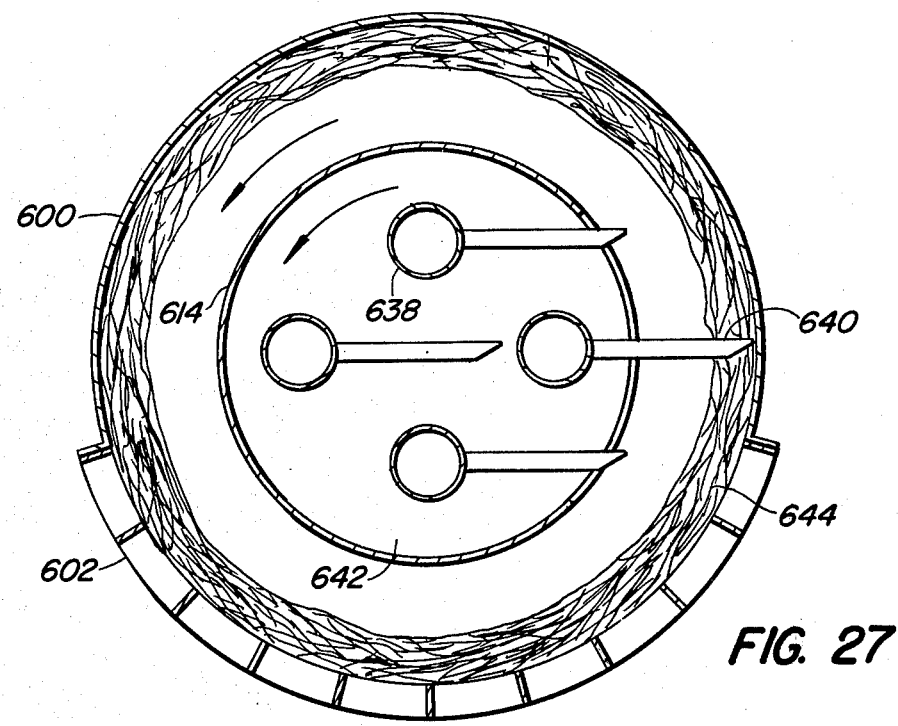
FIG. 27 is a semi-schematic cross-sectional view on line 27—27 of FIG. 26.

In the embodiment of FIGS. 26 and 27, spiral propulsion of the crop material mat, with fingers intermittently engaging crop material mat portions, is obtained with a mechanism very similar to that of the conventional parallel bar side delivery hay rake, revolved bodily inside the separator housing. As exemplified semi-schematically in FIGS. 26 and 27, a separator housing 600, with a grate portion 602, receives threshed crop material from a threshing section through an upstream inlet 604 and discharges it through an outlet 606. The ends of the housing are closed by upstream and downstream bulkheads 608 and 610 respectively. The rotor assembly 612 includes a generally cylindrical drum 614, with a series of helically disposed parallel slots 616, journaled in the housing bulkheads 608 and 610 respectively by upstream and downstream bearings 618 and 620 respectively, the downstream support being in the form of a sleeve 622 extending through the bulkhead 610. The parallel bar assembly 624 includes upstream and downstream reel ends 626 and 628 respectively, obliquely supported by an upstream bearing support 630 and, at the downstream end, by the output shaft 632 of the gear case assembly 634 journaled in the gear case housing 635 which is rigidly connected to the sleeve 622. The housing 635 and sleeve 622 together serve, at least in part, as a rotor frame element. The gear case input shaft 636 is co-axial with and extends through the drum drive sleeve 622.

Four parallel finger bars 638 are connected between the reel ends 626 and 628 respectively, with their connections equally concentrically spaced around and journaled in the respective reel ends 626 and 628. One or both of the reel ends 626 and 628, may be considered as intermediate rotor elements, transmitting the obliquity of the internal bore of housing 635 (and output shaft 632) to displace axially the finger bars 638.

Each finger bar assembly 638 has a series of crop-engaging elements in the form of parallel rigid fingers 640 disposed so that as the parallel bar mechanism 624 is rotatably driven, each finger moves in an oblique orbit, the mechanism timing being such that it maintains a constant orientation with respect to the drum 614 and, during part of the orbit, moving in its slot 616, extends from the drum 614 into the annular space 642 between drum and housing 600. At its maximum extension and penetration of crop material mat 644, the finger 640 extends radially with respect to the drum 614. The drum 614 and the parallel bar assembly 624 are driven by conventional drives (not shown), such as variable speed V-belt or hydrostatic drives, connected respectively to the input sleeve 622 and input 636. It will be clear that by varying relative speeds and directions of rotation so as to control the velocity and paths of the finger 640 relative to the housing 600, direction and rate of throughput of crop material in the separator may be controlled. In this embodiment, each crop-engaging element (finger 640) is articulated in the rotor assembly so that a portion of it moves in a circular path or orbit concentric with the housing but oblique to the housing axis while remaining oriented in a given direction with respect to the rotor frame as the rotor rotates, and so that penetration of a crop material mat, in the space between the rotor and the housing, is radial at least during a portion of the period of engagement of the element with the mat.

In the embodiment of FIG. 26, compared with those of FIGS. 4–9, again the effective eccentricity or intermittent engagement of the crop material engaging elements derives from an extra element of articulation in the rotor rather than eccentricity of the intermediate rotor elements or of the rotor as a whole. In this case the "extra articulation" is the mechanism which maintains the orientation of the finger bar so that the path of the finger outer portions becomes eccentric.

Figure 28:
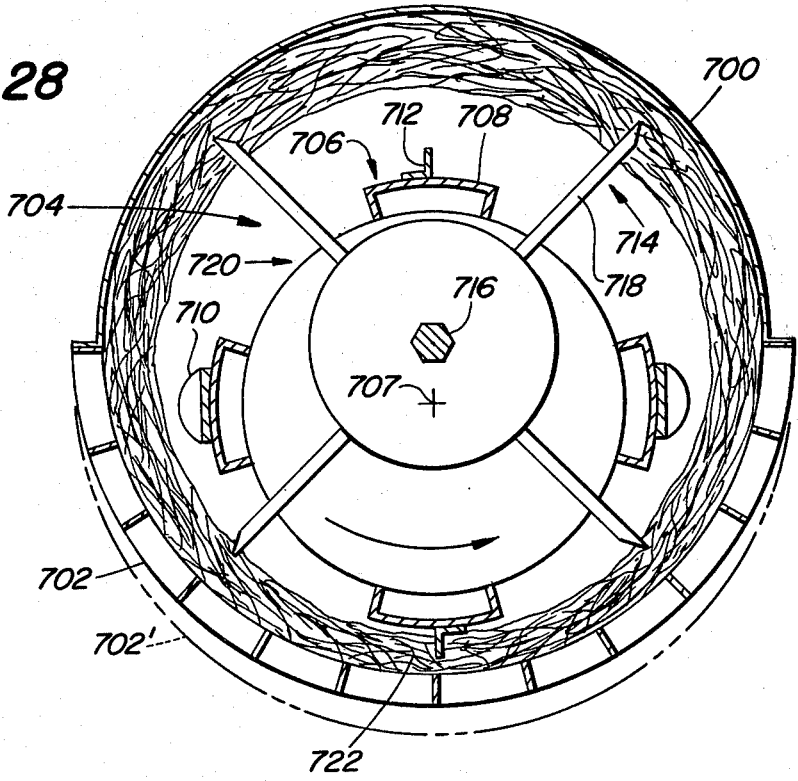
FIG. 28 is a semi-schematic view similar to FIG. 5 of an alternate embodiment of the invention in which a concentric finger wheel arrangement in combination with an eccentric cage or drum is used in the rotor assembly.

The embodiment of FIG. 28 employs components similar to those of the embodiment of FIGS. 4 and 5, but here the rotor assembly comprises a drum assembly or control element eccentric to the housing and assumes additional particular functions (for example, threshing or separating) while the finger wheel rotor elements are concentric with the housing. FIG. 28 shows in semi-schematic cross-section only, an elongated separator assembly including a generally cylindrical housing 700 with a lower foraminous grate portion 702 and an elongated rotor assembly 704 extending within and generally parallel to the housing axis and including a cage-like drum or control element assembly 706 mounted for rotation about an axis 707 below that of the housing 700. The grate 702 may be conventionally adjustable to vary clearances, as indicated by position 702' for example. Circumferentially equally spaced slats 708 carry axially extending functional bars such as the threshing bars 710 and separator bars 712, shown in the drawing. Both types are shown but in a preferred arrangement, the bars would be of one type, threshing or separating, according to the function required.

A plurality of finger wheel assemblies 714 concentrically mounted but journaled in parallel oblique planes are carried on a shaft 716, and have fingers 718 disposed to extend through slots 720 in the drum assembly 706. Driven by conventional means, rotation of the drum assembly 706 will produce and control rotation of the finger wheel assemblies 714 through engagement of the fingers 718 by the slats 708. The fingers 718 move in a substantially constant radial clearance relationship to the housing 700 but the eccentricity of the drum assembly 706 defines a particular functional zone 722 (threshing or separating) adjacent the central part of the grate 702 where the functional bars 710 or 712 approach the grate (or concave) and are dominant in their engagement and processing of the crop material while, due to the eccentricity, the fingers 718 are effectively retracted or withdrawn within the drum. Material which is engaged and propelled by the fingers in the upper portion of the separator, is stripped from the fingers as they withdraw into the drum in the lower portion of the separator. Of course the plane of inclination of the finger wheels 714 may be chosen and controlled to effect a desired degree of axial indexing of crop material (while the fingers are in maximum engagement with the crop material) by inclining the plane of the finger wheel in a manner similar to that indicated in FIG. 7 or FIG. 12. Clearly, the general configuration of FIG. 28 may be used in combination with features of other embodiments disclosed above such as for example, adjustment arrangements similar to those of the embodiments of FIG. 6 for controlling the disposition of the plane of inclination of the finger wheel so as to control rate of throughput, or the location of the drum center to optimize the threshing or separating action.

The several embodiments described are only a few examples of mechanism means appropriate to a crop processor in keeping with the invention. Their nature and the principles and features of the invention set forth above will suggest other embodiments, also with potential for smooth efficient operation using well balanced mechanisms of low specific power consumption and appropriate to a variety of crops and particular processing requirements.

I claim:

1. An axial flow rotary separator for a combine, the combine having a forward harvesting header for gathering crop material from a field and delivering it to a rearward outlet of the header, comprising:

a generally tubular separator housing including a housing wall having an inner surface and at least one foraminous portion and an upstream inlet for receiving at least a portion of the crop material gathered by the header, and a downstream outlet for discharging at least a portion of the crop material received at the inlet, some of the material passing outwards through the foraminous portion;

a rotor supported for rotation and extending within the housing for engaging crop material adjacent the inlet and propelling it to the outlet, the rotor having a frame and an axis of rotation approximately parallel to the axis of the housing and a plurality of crop material-engaging elements carried by the frame, each element having a radially outward portion which defines a path of revolution as the rotor rotates, the inner surface of the housing wall and the path of revolution of the rotor element outward portions cooperating to define a plurality of annular clearances each having spaced apart zones of lesser and of greater radial thickness, and each crop material-engaging element being articulated with respect to the rotor frame so as to provide relative axial movement between at least the radially outward portion of the element and the housing axis as the rotor rotates; and means for rotating the rotor and actuating the crop material-engaging elements so that at least some of the material engaged by the elements is propelled circumferentially at such a speed that it is maintained by centrifugal force in a mat generally in contact with the inner surface of the housing wall, the articulation of the crop material-engaging elements being such that when in a zone of lesser radial thickness, the axial component of the movement of each crop material-engaging element radially outward portion is substantially in a downstream direction so that each element, while engaging the mat, periodically increases and decreases its radial penetration of the mat and, while in such increased penetration, displaces at least a portion of the crop material downstream while also propelling it circumferentially and the net effect is to move the material progressively downstream towards the outlet.

2. The separator set forth in claim 1 wherein the extremity of the radially outward portion of each crop material-engaging element is finger-like and small in cross-sectional area and so oriented and articulated that it penetrates the mat substantially without compressing it.

3. In a combine, having a frame, an axial flow rotary separator comprising:

a generally tubular housing supported by the combine frame and having an at least partially foraminous wall and an upstream inlet and a downstream outlet;

a rotor extending within the housing and having a frame and an axis of rotation approximately parallel to the axis of the housing and including a plurality of crop-engaging elements, each element operatively connected to and movable with respect to the rotor frame and extending at least partially radially outward of the frame and constrained by the connection with the frame to revolve around the axis of the rotor in a path of revolution as the rotor rotates, the operative connection including means for controlling at least the radially outward portion of each element so that during each revolution it moves successively radially towards and away from the inner surface of the housing wall; and means for driving the rotor so that it rotates and engages crop material received at the inlet of the separator housing and, in cooperation with the housing, propels it within the housing, the rotational speed and action of the rotor being such as to tend to maintain the crop material in a mat generally in contact with the inner surface of the housing and the crop material-engaging elements, each responsive to its operative connection with the rotor frame, moving so as to engage portions of the mat during at least a portion of their paths of revolution about the axis of the rotor and, while in engagement, to propel those portions all in substantially the same selected direction with respect to the housing axis, the radial extent of engagement of each element with its mat portion progressively and successively increasing and decreasing as the rotor rotates so that the mat portions are subjected to a variable propulsive effect.

4. The separator set forth in claim 3 wherein the operative connection between the crop material-engaging elements and the rotor frame includes means controlling the path of the radially outward portion of each element as the rotor rotates so that while that portion of the element is moving relatively closer to the inner surface of the housing wall and hence in relatively greater radial engagement with a crop material mat portion, the net displacement of the element is axially downstream so as to urge the engaged portion of the mat axially downstream towards the outlet.

5. An axial flow rotary crop processing unit having an at least partially foraminous, generally cylindrical housing and a rotor rotatable in the housing about an axis substantially parallel to the housing axis and means for driving the rotor so that crop material, introduced into the housing at an upstream inlet is engaged by the rotor, at least some portions of the material being propelled by the rotor with a circumferential speed such that they are maintained by centrifugal force as a mat against the inner surface of the housing and are conveyed downstream in a generally spiral path and discharged at an outlet, and other portions of the material passing outwards through the foramina for collection and further processing characterized in that at least a portion of the rotor carries a plurality of crop material engaging elements connected to a rotor frame member and the drive means includes a rotational input for positively orbiting the crop material engaging elements with respect to the axis of the housing, the elements being so articulated, with respect to the rotor frame member, as to oscillate axially and so that at least a portion of the orbit of each element is eccentric so that it periodically approaches and recedes from the housing inner surface, each element thus potentially intermittently engaging or periodically increasing its engagement with the crop material mat so as to define, while in engagement, an arc of engagement, each element while in engagement moving circumferentially and at the same time being displaced axially in a downstream direction so that as the rotor rotates, each crop material engaging element may control and, relative to the housing inner surface, convey positively a portion of the crop material mat, the intermittent engagement and disengagement causing local disturbance and attenuation of the mat, helping in the processing of the material and facilitating the progressive transfer of crop material mat portions from one element to another so that in aggregate, the crop material mat is conveyed spiral fashion downstream within the housing.

6. The crop processor of claim 5 characterized in that the articulation of each crop material engaging element with respect to the rotor frame member is such that, as the rotor is driven, the orbit of each crop material engaging element is fixed relative to both the housing and the rotor frame member.

7. The crop processor of claim 6 characterized in that the frame member includes a rotor element bearing journal having an axis offset from and oblique to the housing axis and a rotor element rotatably mounted on the oblique bearing journal and connected to at least one generally radially extending crop material engaging element for orbiting said element obliquely and eccentrically within the housing as the rotor is rotatably driven.

8. The crop processor of claim 7 characterized in that the crop material engaging element is finger-like and extends so as to penetrate and withdraw from the crop material mat approximately radially so that the mat is engaged with a minimum of compressive force between the element and the mat.

9. The crop processor of claim 7 characterized in that the rotational input portion of the drive means for orbiting the crop material engaging elements, includes a rotatable drum-like structure extending axially within the housing, generally surrounding the rotor elements and having elongated generally axially extending openings, the crop material engaging elements of the rotor elements extending radially outwards through the openings, at least while in their respective arcs of engagement, and the drum engaging the rotor elements so as to rotate them relative to the housing axis.

10. The crop processor of claim 7 characterized in that means are provided for selectively adjusting the location of the oblique bearing journal portion of the frame member with respect to the housing axis.

11. The crop processor of claim 7 characterized in that the rotor frame member includes a rotatably releasable portion, said portion including, in fixed relationship, the oblique bearing journal, so that the axis of said journal may be selectively rotatably adjusted with respect to the housing axis.

12. The crop processor of claim 5 characterized in that the rotor frame member is rotatably mounted and the rotor drive means includes supplementary drive means for rotating the rotor frame member, the orbital path of each crop material engaging element, at least in its varying axial disposition in relation to the housing, being a resultant of the respective rotational and supplementary drive inputs.

13. The crop processor of claim 12 characterized in that each crop material engaging element has radially outward and inward portions, both in a fixed structural relationship with the rotor element.

14. The crop processor of claim 13 characterized in that the rotor frame member includes a journal bearing portion with an axis oblique to and offset from the housing axis so that, as the rotor frame member is rotated, the bearing journal portion revolves around the housing axis and in that the rotor element is a wheel-like member rotatably mounted on the bearing journal and carrying at least one radially outward extending crop material engaging element.

15. The crop processor of claim 12 characterized in that the crop material engaging element has radially outward and inward portions and the articulation of the rotor includes means for controlling the movement of the crop material engaging element so that, as the supplementary drive means is actuated, each element reciprocates axially and the element outward portion tends to move between positions closer to and more distant from the rotor axis.

16. The crop processor of claim 15 characterized in that the means for controlling the movement of each crop material engaging element includes a pivot offset from the center of gravity of the element and operably connected to the supplementary drive means, for pivotally mounting the element on an axis substantially perpendicular to but offset from the axis of the rotor, and the rotor includes first and second stop means for limiting the movement of the crop material engaging element between a generally erect conveying position and a retracted return stroke position, said positions corresponding to the outward portion of the element being more distant from and closer to the rotor axis respectively, so that in the erect position the element tends to engage the crop material mat and move so as to advance the mat portion axially downstream and in the retracted position the element tends to disengage from the mat while moving upstream, the pivoting movement of the element resulting partly from inertial force caused by the offset center of gravity.

17. The crop processor of claim 16 characterized in that the rotor frame member carries a rigidly attached bearing inner race having a bearing axis oblique to the rotor axis and in that an output rotor element is journaled on the inner race and each crop material engaging element is connected to the output element so as to permit relative circumferential motion between the crop material engaging element and the rotor frame member so that relative rotation between the drive rotational input and the supplementary drive means for actuating the rotor frame member results in axial reciprocation of each crop material engaging element.

18. The crop processor of claim 16 characterized in that the axis of rotation of the rotor frame member and the circumferential path of the inward portion of each crop material engaging element are substantially co-axial with the housing.

19. The crop processor of claim 5 characterized in that the rotor frame member is connected to and rotatably driven by the rotational input of the drive means and the frame member includes a self-contained mechanism carrying a plurality of crop material engaging elements and the drive means includes a supplementary drive means connected to the self-contained mechanism so that, relative to the rotor frame member, each crop material engaging element follows a path having portions relatively closer to and more distant from the frame member axis and in the more distant portion of the path, the motion of the element has an axially downstream component.

20. An axial flow rotary crop processor comprising:
a housing having an upstream inlet and a downstream outlet and a generally cylindrical wall having an inner surface and being at least partially foraminous and including a grate;
a rotor assembly having a principal axis for rotating within the housing and including a plurality of crop material engaging elements, each element constrained to orbit within the housing in a path such that, as the rotor rotates, the motion of the element has an axially downstream component during a substantial portion of the orbit, the crop material engaging elements having outer portions disposed generally adjacent the inner wall of the housing so that crop material introduced into the housing at the inlet is engaged at least by said outer portions, the rotational speed of the rotor being such that the material propelled by the elements tends to be distributed in a relatively thin mat maintained generally in contact with the housing inner surface due to centrifugal force; and
means associated with the rotor for reducing the effective engagement of each crop material engaging element during that portion of its orbit remote from that portion having an axially downstream component, so that the net effect of each element during one orbit is to axially index a portion of the crop material mat in a downstream direction.

21. The crop processor of claim 20 wherein each crop material engaging element includes a generally finger-like, substantially radially extending portion and the means for reducing the engagement of the elements includes a hollow drum-like structure having a generally cylindrical wall and including a plurality of apertures, and having an axis of rotation parallel to but offset from the housing axis and rotor principal axis, the diameter of the drum-like structure being substantially greater than the offset of its axis from the rotor axis, the finger-like portions extending through the apertures so that as the rotor rotates, there is relative retraction and extension of the finger-like portions relative to the wall of the drum-like structure so that, during a portion of its orbit, each element is partially shielded by the wall so as to reduce its effective engagement of the crop material mat.

22. The crop processor of claim 21 wherein the outer surface of the wall of the drum-like structure carries at least one functional bar of axial extent and is disposed so that, while the effective engagement of the crop material engaging elements with a given portion of the mat is reduced, the functional bar engages that mat portion with an effect greater than that of the crop material engaging element.

23. The crop processor of claim 20 wherein the orbit of each crop material engaging element defines a mean plane of rotation having a center approximately co-axial with the housing.

24. A separator for processing harvested crop material including a separator rotor surrounded by and co-operating with a generally cylindrical housing and means for driving the rotor so as to process crop material and convey it in a generally spiral path in the space between the rotor and the housing, the crop material substantially maintaining contact with the wall of the housing, some material passing through foramina in the housing and some being retained in the housing and passing to a downstream outlet, characterized in that the rotor and drive means include:
a rotor frame member supported and extending in the housing and having a principal axis approximately parallel to the housing axis and including a bearing member having an axis inclined to the principal axis;
an intermediate rotor element carried by the rotor frame member for rotation about the bearing member axis, the inclination of said axis resulting in relative reciprocating axial displacement of any given portion of the intermediate rotor element with respect to the housing axis as the rotor element rotates;
a plurality of crop material-engaging elements for rotation with the intermediate rotor element, each element having a finger-like extremity and being operatively connected to and articulated with respect to the intermediate rotor element so that at least during a portion of a revolution of the intermediate element, each finger-like extremity is oriented generally radially outwards with respect to the rotor;
mechanical drive means for directly effecting circumferential motion of the crop material-engaging elements with respect to the rotor axis so that crop material engaged by the elements is propelled circumferentially at such a speed that it is maintained generally in contact with the wall of the housing by centrifugal force; and means operatively associated with each crop material-engaging element for controlling the movement of at least the finger-like extremities so that as the rotor rotates, each such extremity orbits within the housing, successively approaching closer to and receding from the inner surface of the housing wall so as to define an arc of relatively greater engagement of each element with the crop material mat, said arc of engagement approximately coinciding with that portion of the revolution of the element in which the element extremity is generally radially disposed so that the element penetrates and withdraws from the crop material mat with a minimum of compression of the mat, and for controlling the element so that during the arc of relatively greater engagement, the movement of the finger-like extremity includes an axially downstream component so that the aggregate effect of the engagement of the plurality of crop material-engaging elements is to propel the crop material mat spirally downstream.

25. The separator of claim 24 characterized in that the rotor frame member comprises a crankshaft assembly having a crankshaft coaxial with the housing and a crank pin offset from the housing axis and including the inclined bearing portion, said bearing portion being disposed so that its axis is inclined to the common plane of the crankshaft and crank pin.

26. The separator of claim 25 characterized in that it includes means for adjusting the position of the crank pin relative to the housing axis.

27. The separator of claim 25 characterized in that it includes means for rotatably adjusting the crank pin so as to change the effective inclination of the bearing member axis with respect to the common plane of the crankshaft and crank pin.

28. The separator of claim 24 characterized in that it includes drive means for rotatably driving the rotor frame member so that as the rotor rotates the arcs of relatively greater engagement progress around the wall of the housing with a sweeping effect.

29. The separator of claim 28 characterized in that the rotor frame member includes a crankshaft assembly having a crankshaft coaxial with the housing and a crank pin offset from the crankshaft and including the bearing member, the bearing member being disposed so that its axis is inclined to the common plane of the crankshaft and crank pin.

30. The separator of claim 29 characterized in that it includes means for controlling the rotational speed and direction of the intermediate rotor element relative to the rotor frame member bearing element so as to control the net frequency of axial reciprocation of the crop material-engaging elements connected to it and hence the rate and axial direction of throughput of crop material in the housing.

31. The separator of claim 29 characterized in that it includes means for varying the speed of rotation of the rotor frame member.

32. The separator of claim 28 characterized in that the connection of each crop material-engaging element to the intermediate rotor element includes a generally circumferentially oriented pivot for permitting free pivoting of the engaging element in a range limited to between a substantially radially extending engaged position and a retracted position in which it is inclined in a downstream direction so that as each crop material-engaging element reciprocates relative to the housing, it tends to extend and penetrate the crop material mat radially and propel a portion of it downstream during its downstream stroke, and withdraw from and release the mat portion on its upstream stroke.

33. The separator of claim 32 characterized in that the connection of the crop material-engaging elements to the intermediate rotor element includes a finger slat assembly comprising a plurality of circumferentially spaced generally axially extending finger slats each carrying a plurality of the finger pivots and connected to the intermediate rotor element by a single pivotal connection.

34. The separator of claim 33 characterized in that it includes a second finger slat assembly connected to the intermediate rotor element at a point diametrically opposed from that of the connection of the first assembly and disposed so that side-by-side finger slats of the first and second assemblies respectively reciprocate in opposite directions.

35. The separator of claim 33 characterized in that the axis of rotation of the rotor frame member and the axis of the housing coincide and the disposition of the bearing member and of the intermediate rotor element journaled on it are such that the paths of the pivotal connection of the finger slat assembly to the intermediate rotor element is approximately concentric with the housing.

36. The separator of claim 32 characterized in that it includes means for controlling the speed of rotation of the intermediate rotor element relative to the rotor frame member so as to control the frequency of axial reciprocation of the crop material-engaging elements and thus the rate of throughput of the processor.

37. The separator of claim 28 characterized in that the bearing member of the rotor frame member comprises a hollow bore and the intermediate rotor element is journaled in said bore and the connection of the crop material-engaging elements to the intermediate rotor element includes at least one axially extending finger bar carrying the crop material engaging elements and pivotally connected to the intermediate rotor element and so articulated with respect to that element that as the intermediate rotor element rotates, the finger bar remains in a fixed orientation relative to the rotor frame member.

38. The separator of claim 37 characterized in that the rotor frame member is co-axial with the housing and includes a rigidly attached drum-like shroud for the finger bar, concentric with the axis of rotation of the frame member and including a plurality of openings through which the crop material-engaging elements carried by the finger bar successively extend and retract as the rotor rotates.

39. The separator of claim 37 characterized in that the speed of rotation of the intermediate rotor element is adjustable so as to control the rate of throughput of the processor.

40. A separator, especially for harvested crop material, with an at least partially perforated housing wall for permitting some of the crop to pass through, and a rotor disposed in the housing having a frame, in which crop material is conveyed between the rotor and the housing in its longitudinal direction to an outlet and the rotor carries drivable crop engaging elements connected to its frame so that they orbit with respect to the axis of the housing as the rotor rotates and which are so connected to the frame that there is relative movement between the frame and the crop engaging elements characterized in that the drive for the crop engaging elements and their connection to the frame is such that all crop engaging elements while in engagement, convey the crop in the direction of the outlet.

41. The device according to claim 40 wherein for each crop engaging element there is a zone of maximum engagement characterized in that this zone is rotatable within the housing.

42. The device according to claim 40 characterized in that at least a part of the axis of the frame for the crop engaging elements is revolvable about the axis of the housing.

43. The device according to claim 42 characterized in that the frame includes a crankshaft assembly.

44. The device according to claim 42 characterized in that the drives for both the frame and for the crop engaging elements are variable.

45. The device according to claim 40 wherein the frame includes a crankshaft assembly having a crank pin and a wobble plate journaled on the crank pin and carrying the crop engaging elements characterized in that the crank pin is adjustably rotatable within the crankshaft assembly.

46. The device according to claim 40 characterized in that the frame includes an offset portion for journaling the crop engaging elements and that said portion may be held in an adjustably fixed position relative to the housing axis.

47. The device according to claim 40 characterized in that the crop engaging elements are pivotally carried by the rotor so that they are freely swingable in a range limited by a substantially radially extending position and a position in which they are inclined in the direction of conveying.

48. The device according to claim 40 wherein the drive for the crop engaging elements includes a wobble device and a drivable drum characterized in that the wobble device is connected to and reciprocates the drum device and the crop engaging elements are carried by the drum device.

49. The device according to claim 48 characterized in that the rotor includes a second drivable drum device connected to and reciprocated by the wobble device so that the first and second drum devices counter-reciprocate.

50. The device according to claim 49 characterized in that each drum device includes a plurality of circumferentially spaced longitudinal bars for carrying the crop engaging elements and wherein the longitudinal bars of the first and second drum devices are concentric.

51. The device according to claim 48 characterized in that the rotor includes a rotatable shaft for driving the drum devices and that the drum devices are carried by the shaft so as to be longitudinally shiftable and non-rotatable with respect to the shaft.

52. The device according to claim 48 characterized in that the drum devices are carried concentrically within the housing.

53. The device according to claim 40 characterized in that the connection of the crop engaging elements to the frame includes a rotatably driven longitudinal finger bar and the crop engaging elements are rigidly connected to the finger bar.

54. The device according to claim 53 characterized in that the connection of the crop engaging elements to the frame further includes at least one disc journaled on an axis inclined to the housing axis and operatively connected to the longitudinal finger bars.

55. The device according to claim 54 characterized in that the frame includes a rotating drum having inclined slots for the crop engaging elements and the discs are journaled in the drum.

56. The device according to claim 55 characterized in that the drives for the disc and for the drum are independently variable.

57. The device according to claim 54 characterized in that the discs are concentrically arranged in the housing.

58. The device according to claim 40 characterized in that the frame is surrounded by a drum device eccentric to the frame.

59. The device according to claim 58 characterized in that the drum device carries functional bars for engaging the crop material.

60. The device according to claim 59 characterized in that the functional bars are longitudinally arranged on the drum device.

* * * * *